US012709106B2

(12) United States Patent
Saito et al.

(10) Patent No.: US 12,709,106 B2
(45) Date of Patent: Aug. 18, 2026

(54) IMAGE PRINTING APPARATUS AND CONTROL METHOD

(71) Applicant: CANON KABUSHIKI KAISHA, Tokyo (JP)

(72) Inventors: Serena Saito, Kanagawa (JP); Naoko Baba, Kanagawa (JP); Yuji Konno, Kanagawa (JP); Yoshitomo Marumoto, Kanagawa (JP); Shin Genta, Kanagawa (JP); Takayuki Ushiyama, Chiba (JP); Yumi Shimokodachi, Kanagawa (JP); Taichi Yokokawa, Kanagawa (JP)

(73) Assignee: Canon Kabushiki Kaisha, Tokyo (JP)

( * ) Notice: Subject to any disclaimer, the term of this patent is extended or adjusted under 35 U.S.C. 154(b) by 150 days.

(21) Appl. No.: 18/669,935

(22) Filed: May 21, 2024

(65) Prior Publication Data

US 2024/0308251 A1 Sep. 19, 2024

Related U.S. Application Data

(63) Continuation of application No. 17/488,987, filed on Sep. 29, 2021, now Pat. No. 12,023,913.

(30) Foreign Application Priority Data

Sep. 30, 2020 (JP) ................................ 2020-165459

(51) Int. Cl.

*B41J 11/42* (2006.01)
*B41J 13/00* (2006.01)
(Continued)

(52) U.S. Cl.

CPC ............... *B41J 11/42* (2013.01); *B41J 13/00* (2013.01); *B41J 15/22* (2013.01); *B41J 15/18* (2013.01)

(58) Field of Classification Search

CPC ... B41J 11/42; B41J 13/00; B41J 15/22; B41J 15/18

See application file for complete search history.

(56) References Cited

U.S. PATENT DOCUMENTS 7,354,129 B2 4/2008 Uchida
7,578,571 B2 8/2009 Nakano et al.
(Continued)

FOREIGN PATENT DOCUMENTS

JP 2005-060086 A 3/2005
JP 2006-027799 A 2/2006
(Continued)

OTHER PUBLICATIONS

Office Action dated May 7, 2024, in Japanese Patent Application No. 2020-165459.

*Primary Examiner* — Yaovi M Ameh
(74) *Attorney, Agent, or Firm* — Venable LLP

(57) ABSTRACT

An image printing apparatus and a method of controlling the same are capable of appropriately correcting the conveyance amount in each of a plurality of conveyance paths. In a case of conveying a print medium along a first conveyance path, a controller controls the driving of a conveyance motor based on first information. In a case of conveying the print medium along a second conveyance path, the controller controls the driving of the conveyance motor based on second information, which is different from the first information.

15 Claims, 21 Drawing Sheets

(51) Int. Cl.

| | |
|---|---|
| ***B41J 15/22*** | (2006.01) |
| *B41J 15/18* | (2006.01) |

(56) References Cited

U.S. PATENT DOCUMENTS

| | | | | |
|---|---|---|---|---|
| 9,180,699 | B2 | 11/2015 | Iijima | |
| 9,193,189 | B2 | 11/2015 | Suzuki | |
| 2004/0114202 | A1 * | 6/2004 | Ogata | H04N 1/00652 358/486 |
| 2008/0106031 | A1 | 5/2008 | Nakano et al. | |
| 2011/0103867 | A1 | 5/2011 | Iijima | |

FOREIGN PATENT DOCUMENTS

| | | | | | |
|---|---|---|---|---|---|
| JP | 2006103849 | A | * | 4/2006 | B65H 29/22 |
| JP | 2006-272957 | A | | 10/2006 | |
| JP | 2007223722 | A | * | 9/2007 | B65H 5/12 |
| JP | 2008-087340 | A | | 4/2008 | |
| JP | 2010-120339 | A | | 6/2010 | |
| JP | 2011-093674 | A | | 5/2011 | |
| JP | 2012-166566 | A | | 9/2012 | |
| JP | 2013-230690 | A | | 11/2013 | |
| JP | 2015-086034 | A | | 5/2015 | |
| JP | 2016-000643 | A | | 1/2016 | |

* cited by examiner

| | CORRECTION VALUE a FOR FIRST CONVEYANCE PATH | CORRECTION VALUE b FOR SECOND CONVEYANCE PATH |
|---|---|---|
| INITIAL VALUE | a0 | b0 |
| ADJUSTMENT WITH FIRST CONVEYANCE PATH | a1 | $b = b0 : b \rightarrow b1 = b0 + (a1 - a0)$<br>$b \neq b0 : b \rightarrow$ CURRENT VALUE |
| ADJUSTMENT WITH SECOND CONVEYANCE PATH | $a = a0 : a \rightarrow a2 = a0 + (b2 - b0)$<br>$a \neq a0 : a \rightarrow$ CURRENT VALUE | b2 |
| ADJUSTMENTS WITH FIRST AND SECOND CONVEYANCE PATHS | a1 | b2 |

FIG.10

| | CORRECTION VALUE a FOR FIRST CONVEYANCE PATH | SECOND CONVEYANCE PATH | |
|---|---|---|---|
| | | CORRECTION VALUE b FOR FIRST SECTION | CORRECTION VALUE c FOR SECOND SECTION |
| INITIAL VALUE | a0 | b0 | c0 |
| ADJUSTMENT WITH FIRST CONVEYANCE PATH | a1 | $b = b0 : b \rightarrow b1 = b0 + (a1 - a0)$<br>$b \neq b0 : b \rightarrow$ CURRENT VALUE | CURRENT VALUE |
| ADJUSTMENT WITH SECOND CONVEYANCE PATH | $a = a0 : a \rightarrow a2 = a0 + (b2 - b0)$<br>$a \neq a0 : a \rightarrow$ CURRENT VALUE | b2 | c2 |
| ADJUSTMENTS WITH FIRST AND SECOND CONVEYANCE PATHS | a1 | b2 | c2 |

FIG.15

| | CORRECTION VALUE a FOR FIRST CONVEYANCE PATH | SECOND CONVEYANCE PATH | | |
|---|---|---|---|---|
| | | CORRECTION VALUE b FOR FIRST SECTION | CORRECTION VALUE c FOR SECOND SECTION | CORRECTION VALUE d FOR THIRD SECTION |
| INITIAL VALUE | a0 | b0 | c0 | d0 = c0 |
| ADJUSTMENT WITH FIRST CONVEYANCE PATH | a1 | b = b0 : b → b1 =b0 + (a1 - a0)<br>b ≠ b0 : b → CURRENT VALUE | CURRENT VALUE | CURRENT VALUE |
| ADJUSTMENT WITH SECOND CONVEYANCE PATH | a = a0 : a → a2 =a0 + (b2 - b0)<br>a ≠ a0 : a → CURRENT VALUE | b2 | c2 | d2 = c2 |
| ADJUSTMENTS WITH FIRST AND SECOND CONVEYANCE PATHS | a1 | b2 | c2 | d2 = c2 |

FIG.18

IMAGE PRINTING APPARATUS AND CONTROL METHOD

BACKGROUND OF THE INVENTION

Field of the Invention

The present invention relates to an image printing apparatus and a method of controlling the same.

Description of the Related Art

In image printing apparatuses that print an image onto a print medium by using a print head, an error in conveyance of the print medium sometimes affects the image quality. For example, in a serial image printing apparatus, a white stripe appears in an image in a case where the conveyance amount in each conveyance operation is larger than the design value, and a black stripe appears in a case where the conveyance amount is smaller than the design value. These stripes deteriorate the image quality.

Japanese Patent Laid-Open No. 2006-272957 discloses a method for a serial image printing apparatus which includes performing a process of printing a predetermined adjustment pattern and a process of reading it and deriving a correction value for the conveyance amount.

Of image printing apparatuses in recent years, there are those which include a plurality of discharge ports through which to discharge a printed product, and one of these discharge ports can be selected according to the type of the print medium, the usage of the printed product, and so on. In this case, the conveyance path for the print medium is different for each discharge port, and the appropriate correction value for the conveyance amount may also be different for each conveyance path.

Here, Japanese Patent Laid-Open No. 2006-272957 is not focused on deriving an appropriate correction value for each of a plurality of conveyance paths. Thus, in a case where an image printing apparatus having a plurality of discharge ports employs the method of Japanese Patent Laid-Open No. 2006-272957, a correction value obtained by printing the adjustment pattern with one conveyance path is effective for this conveyance path but does not effectively function for the other conveyance path(s) in some cases. In other words, it has been difficult for conventional image printing apparatuses to appropriately correct the conveyance amount in each of a plurality of conveyance paths.

SUMMARY OF THE INVENTION

The present invention has been made to solve the above-described problem. It is therefore an object of the present invention to provide an image printing apparatus and a method of controlling the same which are capable of appropriately correcting the conveyance amount in each of a plurality of conveyance paths.

In a first aspect of the present invention, there is provided an image printing apparatus comprising a conveyance unit that conveys a print medium in a conveyance direction; a printing unit that prints an image onto the print medium conveyed by the conveyance unit; a first conveyance path that guides, in a predetermined direction, the print medium on which the image is being printed by the printing unit; a second conveyance path that guides, in a direction different from the predetermined direction, the print medium on which the image is printed by the printing unit; and a control unit that controls a driving amount of the conveyance unit, wherein the control unit controls driving of the conveyance unit based on first information on an amount of conveyance by the conveyance unit in a case of conveying the print medium along the first conveyance path or based on second information, which is different from the first information, on an amount of conveyance by the conveyance unit in a case of conveying the print medium along the second conveyance path.

In a second aspect of the present invention, there is provided a method of controlling an image printing apparatus, the image printing apparatus comprising: a conveyance unit that conveys a print medium; a printing unit that prints an image onto the print medium conveyed by the conveyance unit; a first conveyance path that guides, in a predetermined direction, the print medium on which the image is being printed by the printing unit; and a second conveyance path that guides, in a direction different from the predetermined direction, the print medium on which the image is being printed by the printing unit, wherein the method comprises controlling driving of the conveyance unit based on first information in a case of printing the image onto the print medium while conveying the print medium along the first conveyance path, and controlling the driving of the conveyance unit based on second information, which is different from the first information, in a case of printing the image onto the print medium while conveying the print medium along the second conveyance path.

Further features of the present invention will become apparent from the following description of exemplary embodiments with reference to the attached drawings.

BRIEF DESCRIPTION OF THE DRAWINGS

FIG. 10 is a diagram for explaining how correction values are updated in the first embodiment;

FIG. 15 is a diagram for explaining how correction values are updated in the second embodiment;

FIG. 18 is a diagram for explaining how correction values are updated in the third embodiment;

DESCRIPTION OF THE EMBODIMENTS

<Basic Configuration of Apparatus>

Figure 1A:
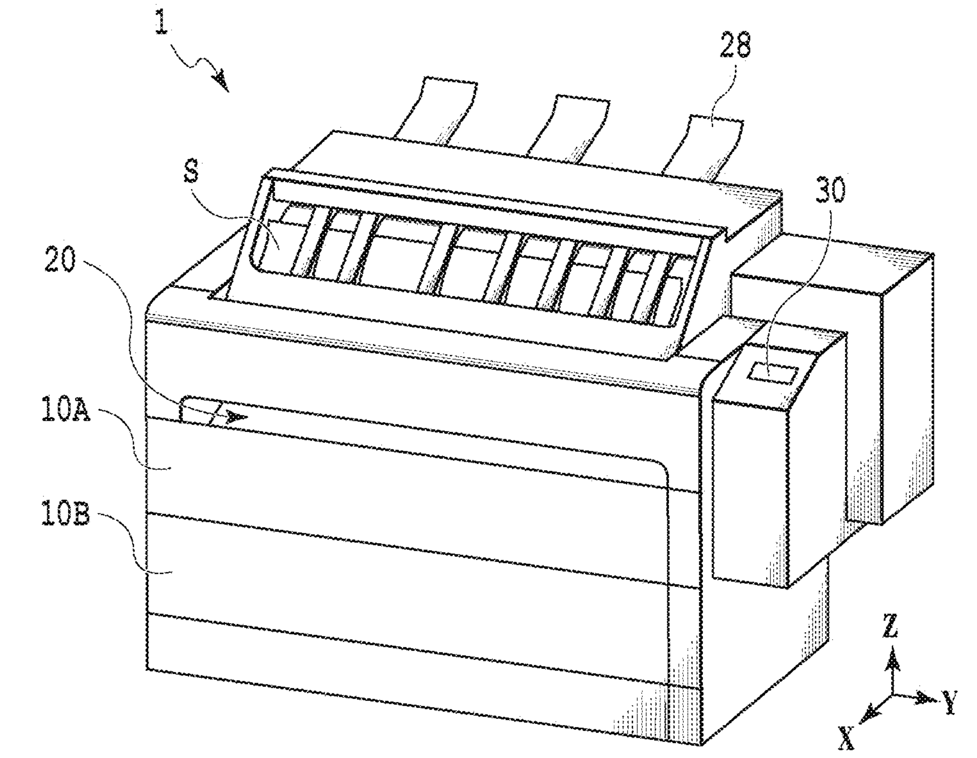
FIGS. 1A and 1B are perspective views of an exterior of an inkjet printing apparatus.
Figure 1B:
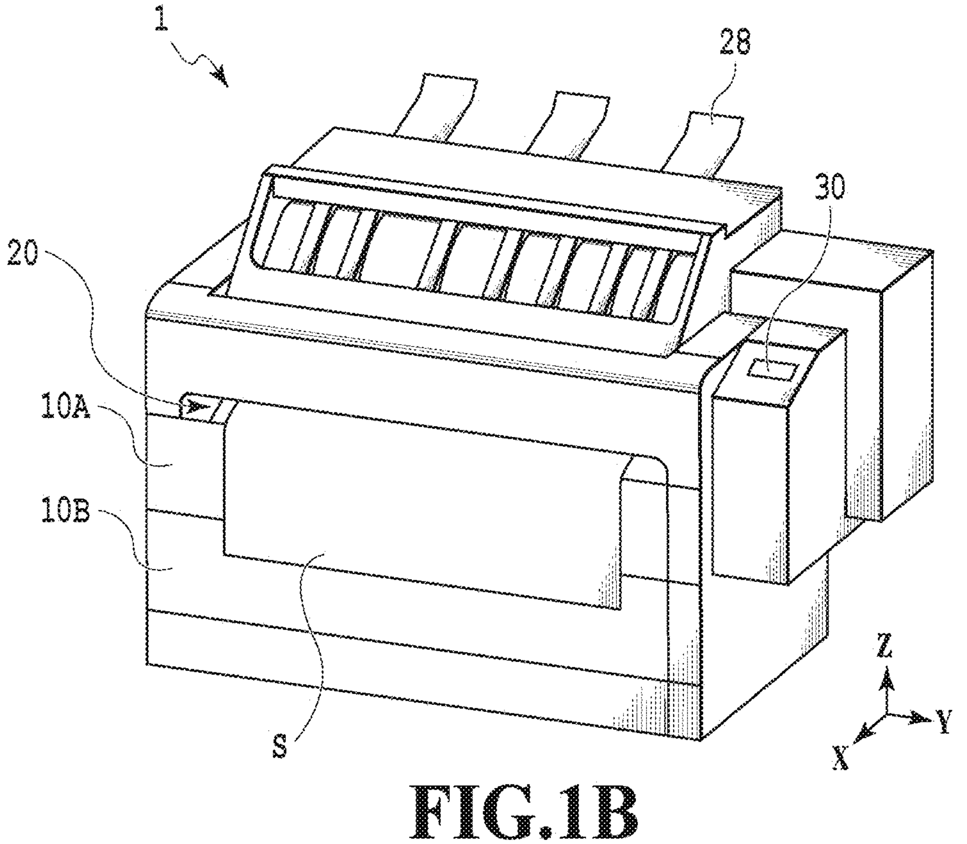

FIGS. 1A and 1B are perspective views of an exterior of an inkjet printing apparatus 1 which can be used as an image printing apparatus of the present invention (hereinafter simply referred to as the printing apparatus 1). In FIGS. 1A and 1B, the X direction represents a direction toward the front of the printing apparatus 1, the Y direction represents the width direction of the printing apparatus 1, and the Z direction represents a vertical direction opposite to gravity. At the front of the printing apparatus 1, two sheet feed units 10A and 10B are provided one on top of the other. With each of the sheet feed units 10A and 10B, the user can mount a roll sheet, which will serve as a print medium, in the printing apparatus 1.

Above the sheet feed units 10A and 10B, a discharge port 20 is provided through which to discharge a printed sheet (hereinafter referred to as "print medium") in a case where front discharge is set. Also, at the top of the printing apparatus 1, a stacker 28 is provided onto which to discharge a printed print medium in a case where top discharge is set.

At a front upper portion of the printing apparatus 1, an operation panel 30 is provided which, for example, displays the state of the printing apparatus 1 and receives commands from the user. By using various switches provided in the operation panel 30, the user can input various commands addressed to the printing apparatus 1, such as designation of the print medium size and type and switching to an online or offline mode. In the present embodiment, the user can also issue instructions to enable a setting as to whether to discharge a printed print medium through the discharge port 20 or onto the stacker 28, and execute a conveyance amount adjustment mode (to be described later) via the operation panel 30.

FIG. 1A illustrates a state where the top discharge is set and a currently printed print medium S is being discharged onto the stacker 28. FIG. 1B, on the other hand, illustrates a state where the front discharge is set and a currently printed print medium S is being discharged through the discharge port 20.

Figure 2A:
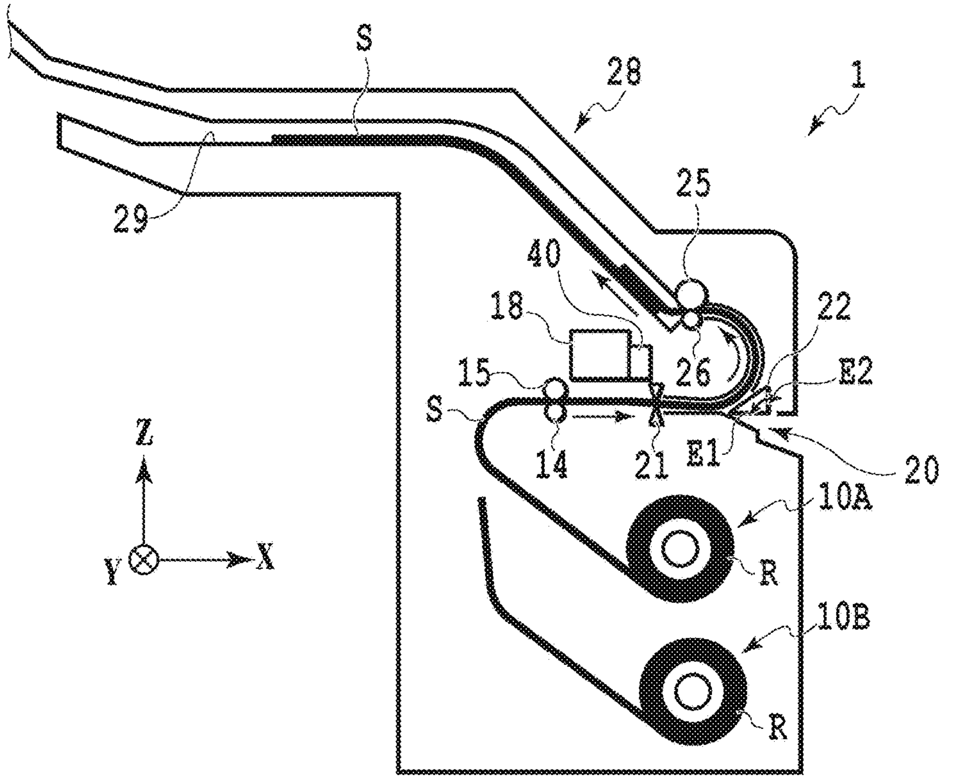
FIGS. 2A and 2B are diagrams for explaining an internal configuration of the printing apparatus.
Figure 2B:
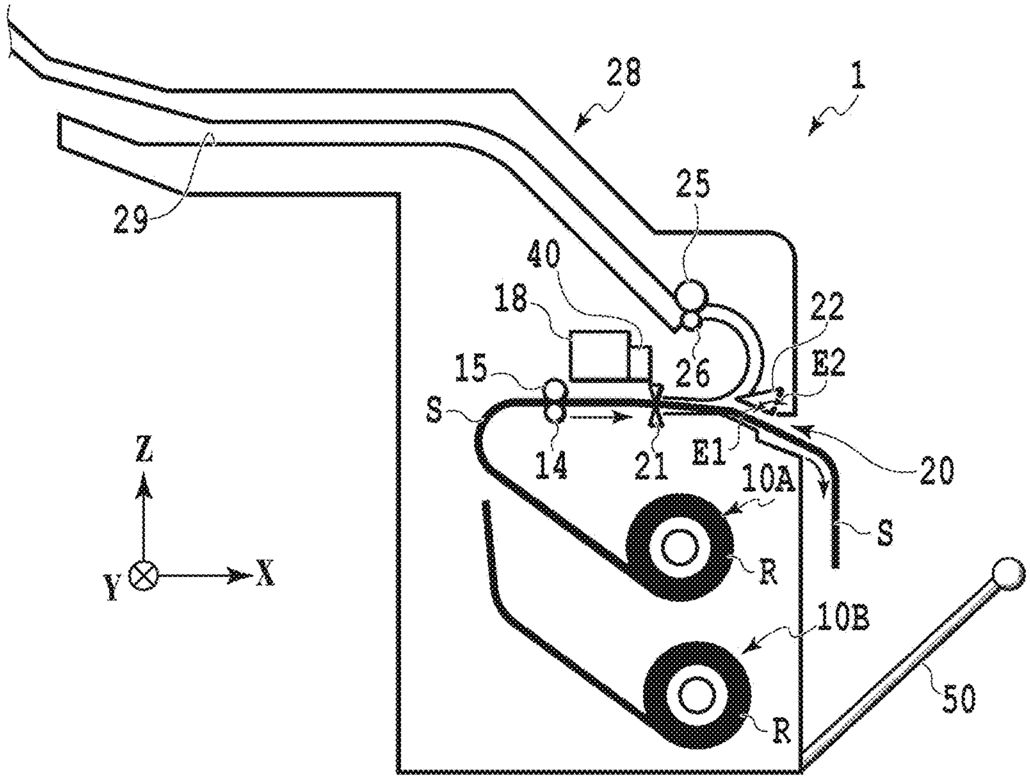

FIGS. 2A and 2B are diagrams for explaining an internal configuration of the printing apparatus 1. FIG. 2A illustrates a printing state in the case where the top discharge is set, and FIG. 2B illustrates a printing state in the case where the front discharge is set.

In response to input of a print command, a roll R carrying a print medium in a designated one of the sheet feed units 10A and 10B rotates, and a print medium S separated from the outer surface of the roll R is guided to a predetermined path and reaches a nip section with a conveyance roller 14 and a nip roller 15. FIGS. 2A and 2B illustrate a case where the print medium S in the top sheet feed unit 10A is designated. In a case where the print medium S in the sheet feed unit 10B is designated, too, the print medium S is conveyed to the above nip section along the same path from an intermediate point.

The conveyance roller 14 is a drive roller that is coupled to a conveyance motor (not illustrated). The nip roller 15 is a driven roller that rotates with rotation of the conveyance roller 14 while nipping the print medium S with the conveyance roller 14.

A print head 18 serving as a printing unit that prints an image onto the print medium S is provided downstream of the roller pair including the conveyance roller 14 and the nip roller 15. The print head 18 in the present embodiment is an inkjet print head in which a plurality of printing elements that eject inks according to print data are arrayed in the X direction, and is capable of reciprocally moving in the Y direction in FIGS. 2A and 2B by means of a main scanning motor (not illustrated). As the print head 18 moves in the Y direction while ejecting the inks, an image of one band is printed onto the print medium S. Then, by repeating such a printing scan for one band and a conveyance operation over a distance corresponding to one band in a direction crossing the printing scan, images are printed in a stepwise manner onto the print medium S.

Figure 3:
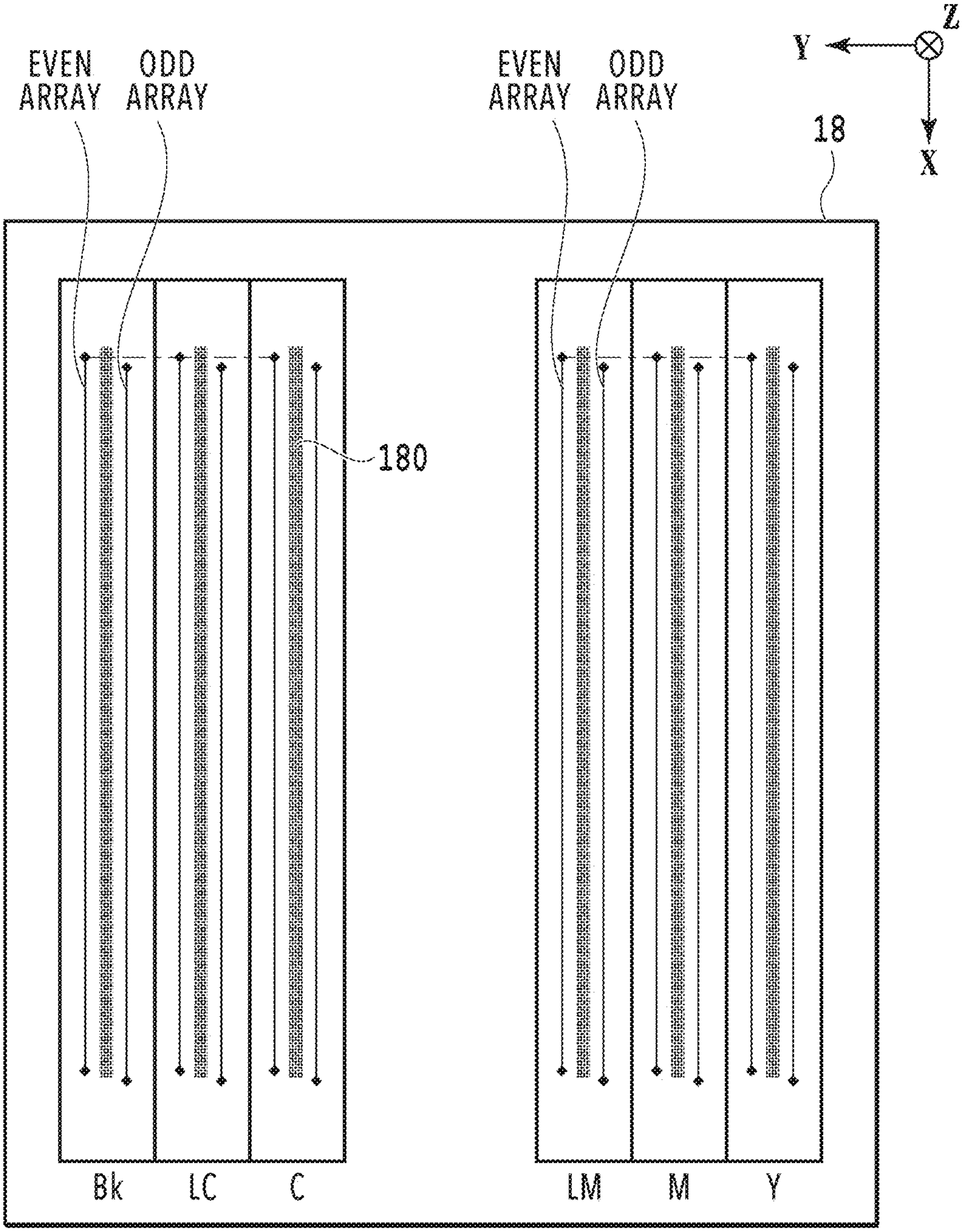
FIG. 3 is a view of a print head as seen from its nozzle surface side.

FIG. 3 is a view of the print head 18 used in the present embodiment as seen from its nozzle surface side. In the print head 18 in the present embodiment, nozzle arrays that respectively eject yellow (Y), magenta (M), light magenta (LM), cyan (C), light cyan (LC), and black (Bk) inks are disposed in the Y direction. The nozzle array for each color is provided with nozzle arrays including an even array and an odd array and an ink supply port 180 as a common port through which to supply the ink to these two nozzle arrays. In each of the even array and the odd array, 640 nozzles through which to eject the ink are arrayed at 600-dpi (dots/inch) intervals in the X direction, and the even array and the odd array are disposed to be offset from each other by a half pitch in the X direction. Accordingly, the nozzle array for each color has 1280 nozzles arrayed at 1200 dpi in the X direction. By causing the print head 18 to eject the inks from the individual nozzles while moving it in the Y direction, which is the main scanning direction, dots can be printed at a resolution of 1200 dpi onto the print medium S.

The description now returns to FIGS. 2A and 2B. An optical sensor 40 capable of reading an adjustment pattern printed by the print head 18 is provided downstream (+X direction side) of the print head 18. A cutter 21 that cuts the print medium S, which is a continuous sheet, is further provided downstream of the optical sensor 40.

A flap 22 that switches the conveyance path for the print medium S is further provided downstream of the cutter 21. The flap 22 determines the conveyance path for the print medium S conveyed thereto by turning in the direction of an arrow E1 or E2 in FIGS. 2A and 2B. In FIG. 2A illustrating the top discharge, the flap 22 has turned to the E1 side, thereby closing the entrance to the discharge port 20 and guiding the print medium S conveyed thereto to the conveyance path above. On the other hand, in FIG. 2B illustrating the front discharge, the flap 22 has turned to the E2 side, thereby retracting from the entrance to the discharge port 20 and guiding the print medium S conveyed thereto to the discharge port 20.

The conveyance path above the flap 22 is provided with a sheet discharge roller 25 and a sheet discharge nip roller 26. The sheet discharge roller 25 is a drive roller that is coupled to a sheet discharge motor (not illustrated). The sheet discharge nip roller 26 is a driven roller that rotates with rotation of the sheet discharge roller 25 while nipping the print medium S with the sheet discharge roller 25. The print medium S having reached the nip section with the sheet discharge roller 25 and the sheet discharge nip roller 26 is nipped by the nip section with the conveyance roller 14 and the nip roller 15 and the nip section with the sheet discharge roller 25 and the sheet discharge nip roller 26. Then, with the two driving motors as the driving sources, the print medium S is conveyed against gravity toward the stacker 28 disposed at a higher position.

When the last printing scan by the print head 18 ends and the trailing edge of the image is conveyed downstream of the cutter 21, the cutter 21 cuts the print medium S. Thereafter, in the case where the top discharge is set, the cut print medium S is conveyed by the sheet discharge roller 25 and the sheet discharge nip roller 26 until its trailing edge passes the nip section with the sheet discharge roller 25 and the sheet discharge nip roller 26. The cut print medium S is then discharged onto a tray 29 of the stacker 28 (see FIG. 2A). A plurality of print media discharged successively can be stacked and held on the stacker 28.

On the other hand, in the case where the front discharge is set, the cut print medium S is discharged from the discharge port 20 by its own weight (see FIG. 2B). FIG. 2B illustrates a state where a storage part 50 provided at a lower portion of the apparatus is pulled out forward. The print medium S discharged from the discharge port 20 drops with its own weight and is stored on the storage part 50 when its trailing edge is cut.

Figure 4:
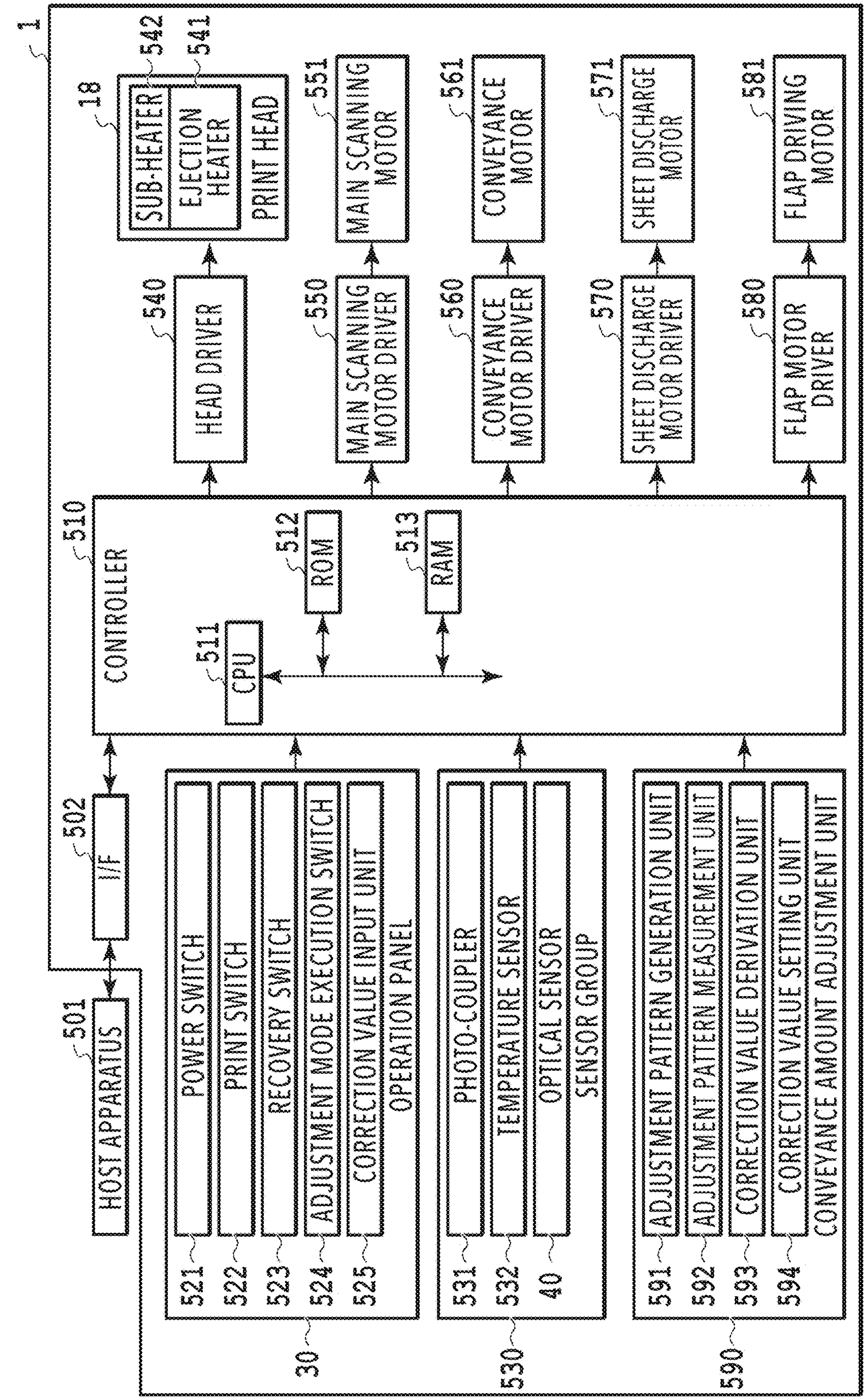
FIG. 4 is a block diagram for explaining a control configuration of the printing apparatus.

FIG. 4 is a block diagram for explaining a control configuration of the printing apparatus 1. A controller 510 has a CPU 511 in the form of a microcomputer, a ROM 512 storing programs, predetermined tables, and fixed data, and a RAM 513 provided with an area to load image data, a work area, and the like, and controls the entire apparatus. The CPU 511 controls various mechanisms in the apparatus in accordance with the programs stored in the ROM 512 while using the RAM 513 as a work area.

A host apparatus 501, which is externally connected, is a supply source of image data. The host apparatus 501 may be in the form of a computer that performs generation, processing, and so on of image data related to printing or in the form of a reader unit that reads images or the like. Commands, status signals, and so on as well as image data are transmitted and received between the host apparatus 501 and the controller 510 via an interface (I/F) 502. The CPU 511 performs predetermined image processing on image data received from the host apparatus 501 in accordance with a program stored in the ROM 512 to thereby generate print data printable by the print head 18 and stores it in the RAM 513. Then, while reading out the stored print data in the RAM 513 piece by piece, the CPU 511 controls a head driver 540, a main scanning motor driver 550, a conveyance motor driver 560, a sheet discharge motor driver 570, a flap motor driver 580, and so on to print an image onto a print medium.

The operation panel 30 is provided with a power switch 521, a print switch 522 with which to issue an instruction to start printing, and a recovery switch 523 with which to issue an instruction to perform a maintenance process on the print head 18. The operation panel 30 is also provided with an adjustment mode execution switch 524 with which to issue an instruction to execute the later-described conveyance amount adjustment mode, and a correction value input unit 525 with which the user can manually input correction values obtained by the conveyance amount adjustment mode.

A sensor group 530 is a group of various sensors that detect the state of the printing apparatus 1, the state of a printed product, and so on. The sensor group 530 includes a photo-coupler 531 which detects the position of the print head 18 in the main scanning direction, a temperature sensor 532 which detects the ambient temperature, the optical sensor 40, which measures the density of the adjustment pattern, and so on. Detection results from the various sensors are transmitted to the controller 510.

A conveyance amount adjustment unit 590 executes the conveyance amount adjustment mode in the present embodiment and manages the correction values obtained by the conveyance amount adjustment mode under instruction of the CPU 511. The conveyance amount adjustment unit 590 has an adjustment pattern generation unit 591 that generates a predetermined adjustment pattern, an adjustment pattern measurement unit 592 that measures the optical density of the adjustment pattern, a correction value derivation unit 593 that derives correction values from the measurement result, and a correction value setting unit 594 that sets the correction values.

The head driver 540 drives the print head 18 according to print data generated by the CPU 511. The print head 18 in the present embodiment is an electrothermal print head in which a plurality of ejection heaters 541 being electrothermal conversion elements are provided in the respective nozzles. In response to the head driver 540 applying a voltage to the ejection heaters 541 according to the print data, the inks are ejected from the individual nozzles. The head driver 540 includes a shift register that aligns the print data such that its data pieces correspond to the positions of the ejection heaters 541, and a latch circuit that latches the print data with appropriate timing. The head driver 540 also includes a logic circuit element that actuates the ejection heaters 541 in synchronization with driving timing signals, a timing setting unit that sets appropriate driving timings (ejection timings) so as to align the dot formation positions, and so on.

The print head 18 is provided with a sub-heater 542 that maintains the print head 18 at an appropriate temperature, in addition to the ejection heaters 541. While the sub-heater 542 may be formed on the same substrate as that of the ejection heaters 541, it may be attached to a portion other than the substrate of the print head 18.

A main scanning motor 551 is a motor that moves the print head 18 in the printing scan direction (Y direction), and the main scanning motor driver 550 is a driver that drives the main scanning motor 551. A conveyance motor 561 is a motor that rotates the conveyance roller 14 explained in FIGS. 2A and 2B, and the conveyance motor driver 560 is a driver that drives the conveyance motor 561. A sheet discharge motor 571 is a motor that rotates the sheet discharge roller 25 explained in FIGS. 2A and 2B, and the sheet discharge motor driver 570 is a driver that drives the sheet discharge motor 571.

A flap driving motor 581 is a motor that turns the flap 22 explained in FIGS. 2A and 2B, and the flap motor driver 580 is a driver that drives the flap driving motor 581.

<Common Conveyance Amount Adjustment Mode>

Figure 5:
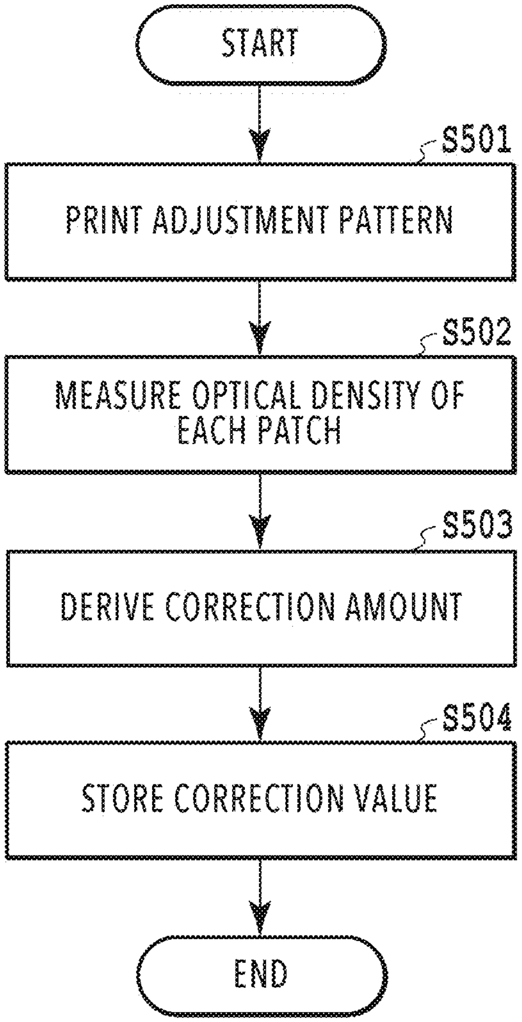
FIG. 5 is a flowchart for explaining a common conveyance amount adjustment mode.

FIG. 5 is a flowchart for explaining steps in a case where the printing apparatus 1 in the present embodiment executes the conveyance amount adjustment mode disclosed in Japanese Patent Laid-Open No. 2006-272957. The CPU 511 executes this process by controlling the mechanisms in the conveyance amount adjustment unit 590 explained in FIG. 3 in accordance with a program stored in the ROM 512 while using the RAM 513 as a work area. Incidentally, this process can be started in response to the user pressing the adjustment mode execution switch 524 explained in FIG. 4 or issuing an instruction to execute the conveyance amount adjustment mode on a UI on the host apparatus 501.

Upon start of this process, the CPU 511 firstly prints the predetermined adjustment pattern in S501. Specifically, the CPU 511 causes the adjustment pattern generation unit 591 to generate the predetermined adjustment pattern and causes the print head 18 to print the generated adjustment pattern while controlling the main scanning motor 551, the conveyance motor 561, the sheet discharge motor 571, and the head driver 540.

Figure 6:
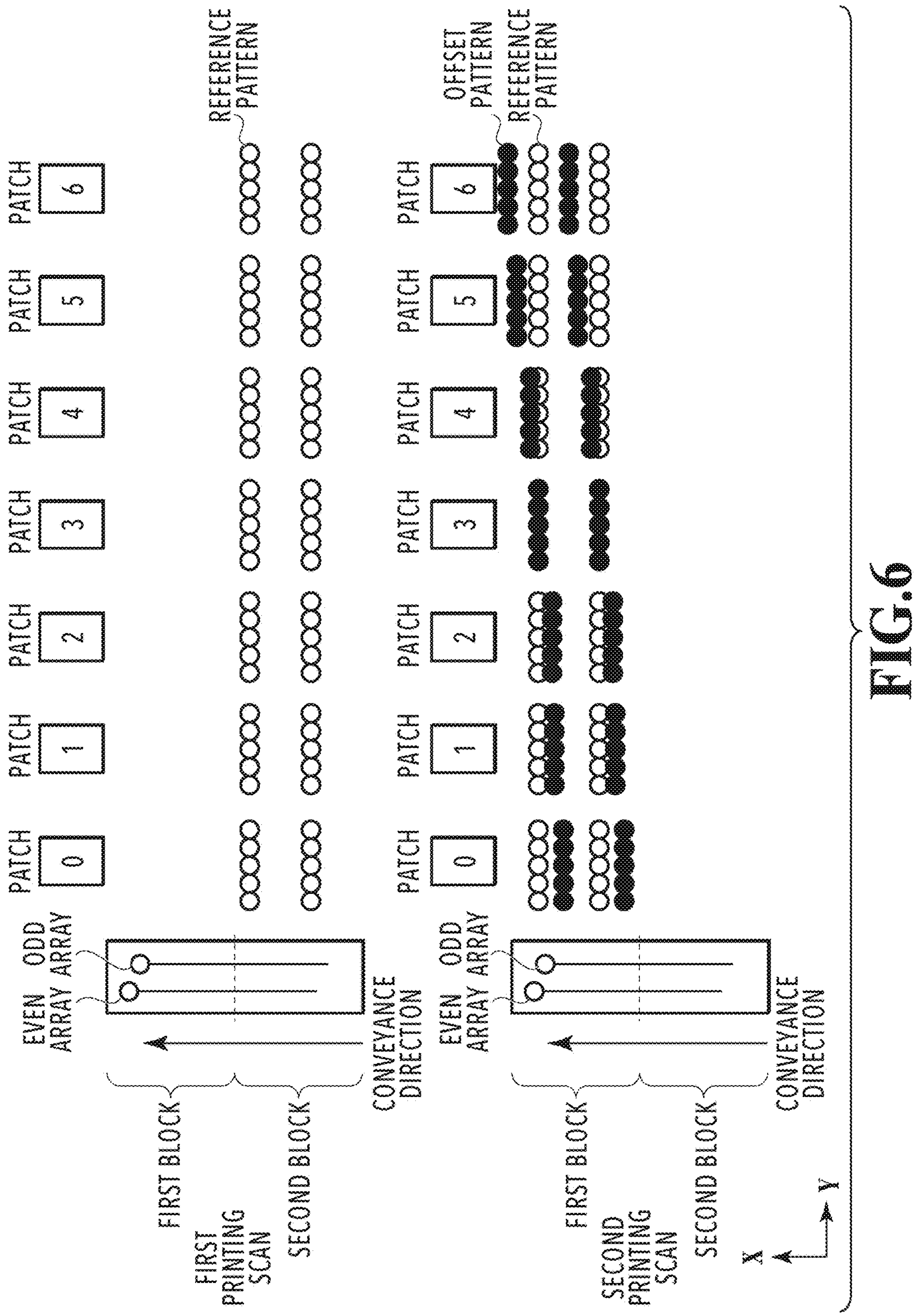
FIG. 6 is a schematic diagram for explaining a method of printing an adjustment pattern.

FIG. 6 is a schematic diagram for explaining a method of printing the adjustment pattern. The adjustment pattern in this example includes seven patches (patches 0 to 6) arrayed in the Y direction, and each patch is to be printed by two printing scans using the black nozzle array. Details will be described below.

For the printing of the adjustment pattern, the black nozzle array is divided into a downstream first block and an upstream second block. Each block includes 640 nozzles, including the even array and the odd array.

In the first printing scan, the CPU 511 uses predetermined nozzles included in the second block to print reference patterns at each of positions corresponding to the patches. In FIG. 6, dots printed as the reference patterns are indicated by the white circles. FIG. 6 illustrates an example in which two reference patterns are printed for each patch. Each series of reference patterns are printed at the same position in the conveyance direction with the same nozzle for each patch. Hereinafter, the nozzles to be used to print the reference patterns will be referred to as the reference nozzles for convenience.

After the first printing scan is completed, the CPU 511 conveys the print medium S by a distance equivalent to 640 pixels at 1200 dpi, i.e., half of the nozzle array. In the present embodiment, the CPU 511 is capable of designating a conveyance amount at a resolution of 9600 dpi for the conveyance motor driver 560 and the sheet discharge motor driver 570. More specifically, the configuration is such that transmitting one pulse conveys the print medium S by one pixel at 9600 dpi. The CPU 511 transmits as many pulses as the number of pixels corresponding to the target conveyance amount as an instruction pulse value. 640 pixels at 1200 dpi are equivalent to 5120 pixels at 9600 dpi. Thus, in this example, the CPU 511 transmits an instruction pulse value indicating 5120 pulses to the conveyance motor driver 560 and the sheet discharge motor driver 570. Since 1 inch is approximately 25.4 mm, the conveyance distance is $$25.4\ \text{mm} \times 640/1200 = 13.55\ \text{mm}$$

if no error is present.

In the second printing scan, the CPU 511 uses predetermined nozzles included in the first block to print offset patterns. In FIG. 6, dots printed as the offset patterns are indicated by the black circles. While each series of reference patterns indicated by the white circles have been printed using the same nozzle for the patches 0 to 6, each series of offset patterns are printed using different nozzles for each patch. In this example, the offset patterns for the patch 3 are printed using the nozzles located away from the respective reference nozzles by 640 pixels, i.e., the same distance as the conveyance amount mentioned above. Hereinafter, the nozzles to be used for the patch 3, which are located away from the respective reference nozzles by a distance of 640 pixels, will be referred to as relative reference nozzles for convenience. The offset patterns for the patch 2 are printed using the first downstream nozzles from the respective relative reference nozzles. The offset patterns for the patch 1 are printed using the second downstream nozzles from the respective relative reference nozzles. The offset patterns for the patch 0 are printed using the third downstream nozzles from the respective relative reference nozzles.

On the other hand, the offset patterns for the patch 4 are printed using the first upstream nozzles from the respective relative reference nozzles. The offset patterns for the patch 5 are printed using the second upstream nozzles from the respective relative reference nozzles. The offset patterns for the patch 6 are printed using the third upstream nozzles from the respective relative reference nozzles.

Figure 7:
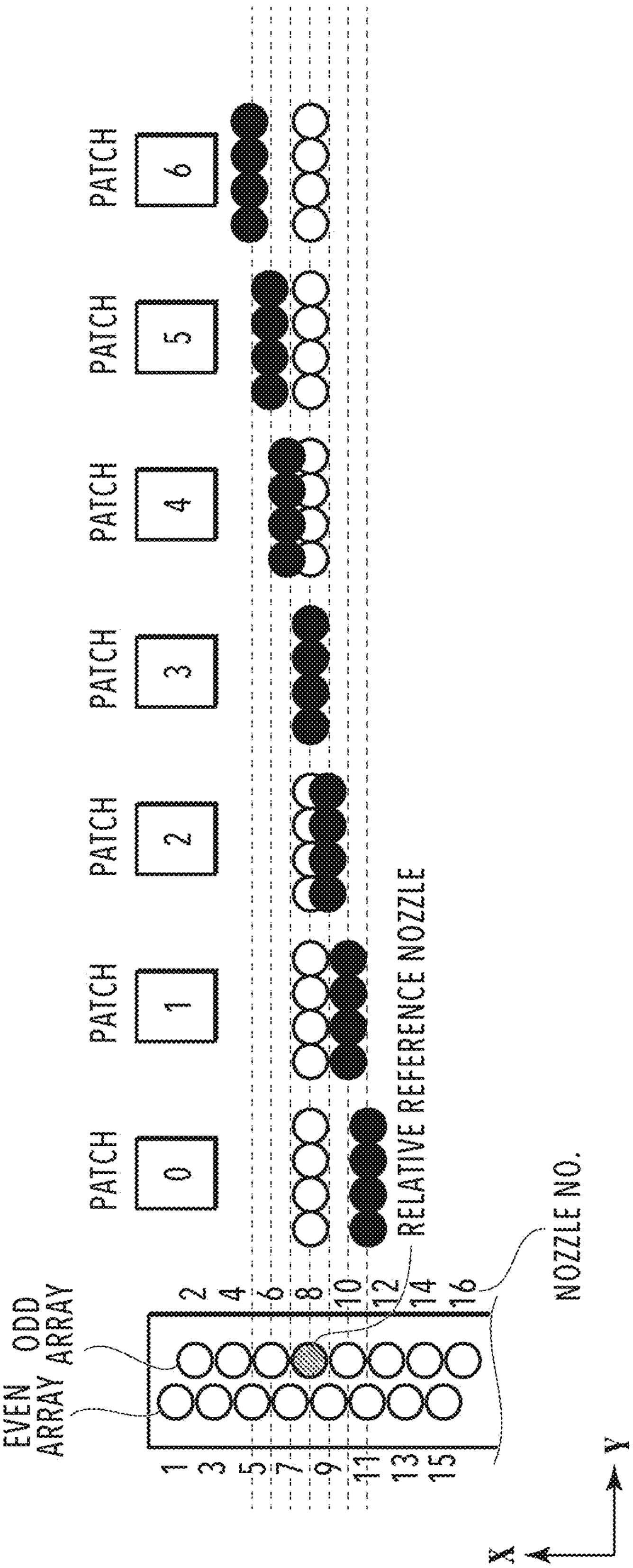
FIG. 7 is a diagram illustrating a printed state of dots for each patch.

FIG. 7 is a diagram illustrating the printed state of dots for each patch. FIG. 7 illustrates a case where, of the plurality of nozzles arrayed in the nozzle array, the 16 nozzles in the first block from its end are denoted as nozzles 1 to 16, with the nozzle 8 being a relative reference nozzle. The offset pattern for the patch 3 is printed on the reference pattern printed by the reference nozzle after a 640-pixel conveyance operation by the relative reference nozzle, which is located away from the reference nozzle by 640 pixels. Thus, the printing position of the reference nozzle and the printing position of the relative reference nozzle matches, so that the reference pattern indicated by white circles and the offset pattern indicated by black circles completely overlap with each other. On the other hand, for those patches assigned nozzles other than the relative reference nozzle (nozzle 8) for printing their offset patterns, the offset between the offset pattern and the reference pattern increases the farther the nozzle for printing the offset pattern is located away from the relative reference nozzle.

Here, FIG. 7 represents an example in which the print medium S is conveyed nearly exactly by 640 pixels in the conveyance operation between the first and second printing scans. If the amount of conveyance of the print medium S is larger or smaller than 640 pixels, the state of overlap between each offset pattern and the corresponding reference pattern will vary in proportion to the amount of that shift. For example, in a case where the patch 2 is the patch whose reference pattern and offset pattern overlap to the greatest degree, it is possible to determine that the conveyance amount in the conveyance operation performed between the first and second printing scans is shorter than the design value by one pixel. Alternatively, in a case where, for example, the patch 4 is the patch whose reference pattern and offset pattern overlap to the greatest degree, it is possible to determine that the conveyance amount in the conveyance operation performed between the first and second printing scans is longer than the design value by one pixel. In the conveyance amount adjustment mode, the conveyance error between the actual conveyance amount and the design value is derived by utilizing the fact that the degree of overlap between the dots of the reference pattern and the dots of the offset pattern is reflected in the optical density.

The description now returns to the flowchart in FIG. 5. In S502, the CPU 511 measures the optical density of each patch printed in S501. Specifically, the CPU 511 firstly conveys the print medium S to a position where the optical sensor 40 provided downstream of the print head can measure each patch printed in S501. The CPU 511 then moves the print head 18 in the Y direction by driving the main scanning motor 551 and measures the optical density of each patch by using the optical sensor 40.

In S503, the CPU 511 derives a correction amount for the conveyance amount. Here, referring to FIG. 7 again, among the patches 0 to 6, the patch 3, whose reference pattern and offset pattern overlap to the greatest degree, has the smallest dot coverage on the print medium S, so that the lowest optical density is detected from the patch 3. This means that the distance between the nozzle used to print the offset pattern for the patch with the lowest optical density and the relative reference nozzle can be assume as the error in the conveyance amount, i.e., the conveyance amount to be corrected.

For example, in a case where the optical density of the patch 3 is the lowest, it is possible to assume that the error in the conveyance amount is ±0 pixel (±0 μm) and the correction amount is ±0 pixel (±0 μm). Alternatively, in a case where the optical density of the patch 2 is the lowest, the conveyance amount is smaller than the target value by one pixel, and therefore the correction amount to correct this is ±1 pixel (+21 μm). Still alternatively, in a case where the optical density of the patch 4 is the lowest, the conveyance amount is larger than the target value by one pixel, and therefore the correction amount is −1 pixel (−21 μm). Thus, in S503, the correction amount for the conveyance amount can be derived within a range of ±3 pixels (±63 μm).

In S504, the CPU 511 converts the correction amount derived in S503 into an instruction pulse value and stores it as a correction value in a memory. For example, in the case where the correction amount is +1 pixel (+21 μm), the CPU 511 stores +8, which is obtained by conversion in terms of 9600 dpi, as the correction value. By the above step, this process ends.

After that, when a print command is input, the CPU 511 reads out the correction value stored in the memory and adds it to a reference instruction pulse value (5120) to thereby correct the instruction pulse value. Then, in each conveyance operation, the CPU 511 transmits the corrected instruction pulses to the conveyance motor driver 560 and the sheet discharge motor driver 570. In this way, the print medium can be conveyed by the target conveyance amount (13.55 mm) in each conveyance operation.

Note that FIG. 7 illustrates an example in which the reference pattern and the offset pattern for each of the patches 0, 1, 5, and 6 are completely isolated from each other in the conveyance direction. In this case, these four patches have an equal dot coverage, so that their optical densities measured in S502 are also substantially equal. However, there is a case where each dot is designed to be a larger size. For example, in a case where the average amount of ejection from each nozzle is 4 pl, a single ejection forms a dot measuring 40 to 50 μm in diameter on a commonly used print medium. This leads to a state where the reference pattern and the offset pattern for each of the patches 1 and 5, which are located away from each other by two or more pixels, partially overlap. Even in such a case, the patch whose reference pattern and offset pattern have the smallest offset still has the lowest dot coverage and the lowest optical density, and the correction value can therefore be derived based on the patch with the lowest optical density.

Also, each dot's size and landing position on the print medium vary depending on the nozzle. For this reason, to derive a reliable correction value, it is preferred to print each patch with a plurality of nozzles in each of the first and second printing scans. Specifically, for each patch, a plurality of reference nozzles and relative reference nozzles be used to print the patch are prepared at constant intervals (e.g., six-nozzle intervals), and a plurality of reference patterns and offset patterns are printed in the patch. Then, for each patch, the optical density of the entire patch region is measured. In this way, it is possible to measure and compare the optical density of each patch based on the total coverage of the plurality of reference patterns and offset patterns and therefore derive a reliable correction value.

For example, by preparing reference nozzles and relative reference nozzles at six-nozzle intervals, the dot coverage of the patches 0 and 6 will be approximately 100% and the dot coverage of the patch 3 will be approximately 50% even in the case where the dot diameter varies within a range of 40 to 50 μm. Such a large difference in dot coverage appears as a clear difference in optical density too. In other words, even in a case where a plurality of nozzles somewhat vary in ejection characteristics, the correction value for the conveyance amount can be determined appropriately based on the ejection characteristics of the plurality of nozzles combined together.

Note that the optical sensor 40 does not necessarily have to be used to determine the patch with the smallest coverage, i.e., the lowest density. For example, the configuration may be such that the user visually determines the patch with the lowest optical density and inputs it from the correction value input unit 525 of the operation panel.

Also, in the above, a description has been given of a case of deriving the correction value in units of 1 pixel at 1200 dpi. Alternatively, in the present embodiment, in which the conveyance amount is designated at a resolution of 9600 dpi, the correction value may be set in units of 1 pixel at 9600 dpi. In this case, from the optical densities of the above seven patches, an approximate curve of the offset amounts and the optical densities may be derived and the correction value may be derived from the offset amount with which the optical density is the minimum value.

Further, in the above, a description has been given of an example in which the reference patterns are printed using the second block located upstream in the conveyance direction (X direction) and the offset patterns are printed using the first block located downstream in the conveyance direction. Alternatively, the reference patterns may be printed using the first block and the offset patterns may be printed using the second block. With this configuration too, an appropriate correction value and conveyance amount can be determined based on a principle similar to the one described above.

<Problem with Conveyance Amount Adjustment>

The accuracy of conveyance of a print medium sometimes varies by the conveyance condition, specifically, the conveyance path. For example, while the print medium S is conveyed along the conveyance path for the top discharge illustrated in FIG. 2A by cooperation of the conveyance motor 561 and the sheet discharge motor 571, the print medium S is conveyed along the conveyance path for the front discharge illustrated in FIG. 2B only by the conveyance motor 561 as the driving source. Moreover, while the print medium S is moved against gravity in the top discharge, the print medium S is conveyed substantially horizontally in the front discharge. These differences in conveyance condition affect the conveyance accuracy. Thus, the appropriate correction value for the conveyance amount is assumed to be different between the top discharge and the front discharge.

Given such a circumstance, in a case of executing the conveyance amount adjustment mode explained in FIG. 5 with the top discharge, an appropriate conveyance amount for the top discharge is stored in the memory. Thus, in a case where the next printing is performed with the front discharge, there is a possibility that the conveyance operation will be not performed with an appropriate conveyance amount. On the other hand, in a case of executing the conveyance amount adjustment mode with the front discharge, an appropriate conveyance amount for the front discharge is stored in the memory. Thus, in a case where the next printing is performed with the top discharge, there is a possibility that the conveyance operation will be not performed with an appropriate conveyance amount. In view of the above circumstance, the present embodiment employs a configuration in which an appropriate conveyance amount can be set for each individual conveyance path.

Specific examples of conveyance amount adjustment modes that can be executed by the printing apparatus 1 in the present embodiment explained in FIGS. 1A to 4 will be described below as some embodiments.

First Embodiment

The first embodiment employs a configuration in which a correction value can be individually set for each of the front discharge and the top discharge.

Figure 8:
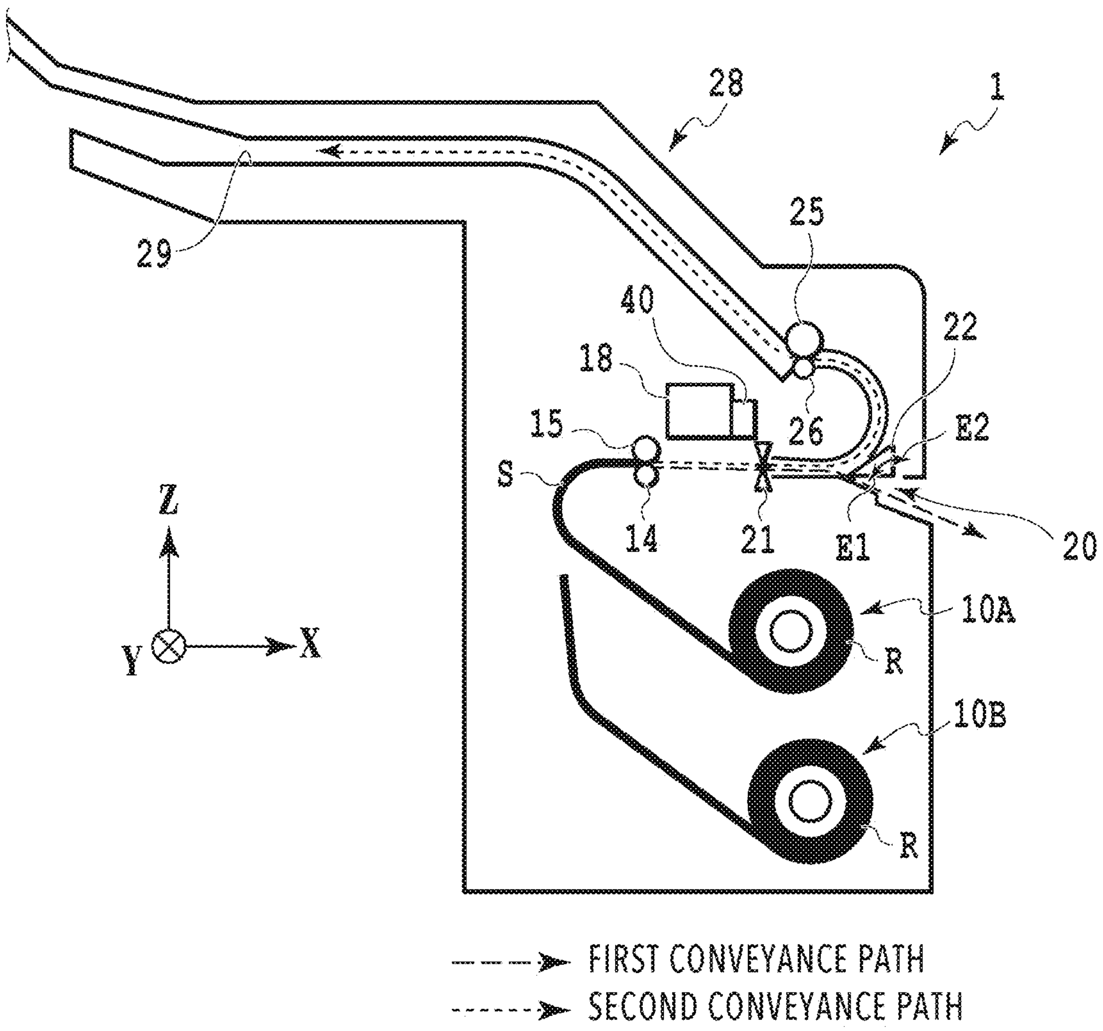
FIG. 8 is a diagram illustrating a conveyance path for front discharge and a conveyance path for top discharge.

FIG. 8 is a diagram illustrating the conveyance path for the front discharge and the conveyance path for the top discharge. Hereinafter, the conveyance path from the nip section with the conveyance roller 14 and the nip roller 15 to the discharge port 20 will be referred to as the first conveyance path. Also, the conveyance path from the nip section with the conveyance roller 14 and the nip roller 15 to the stacker 28 through the nip section with the sheet discharge roller 25 and the sheet discharge nip roller 26 will be referred to as the second conveyance path. The first conveyance path is the conveyance path along which the print medium S is conveyed in the case where the front discharge is set. The second conveyance path is the conveyance path along which the print medium S is conveyed in the case where the top discharge is set.

Figure 9:
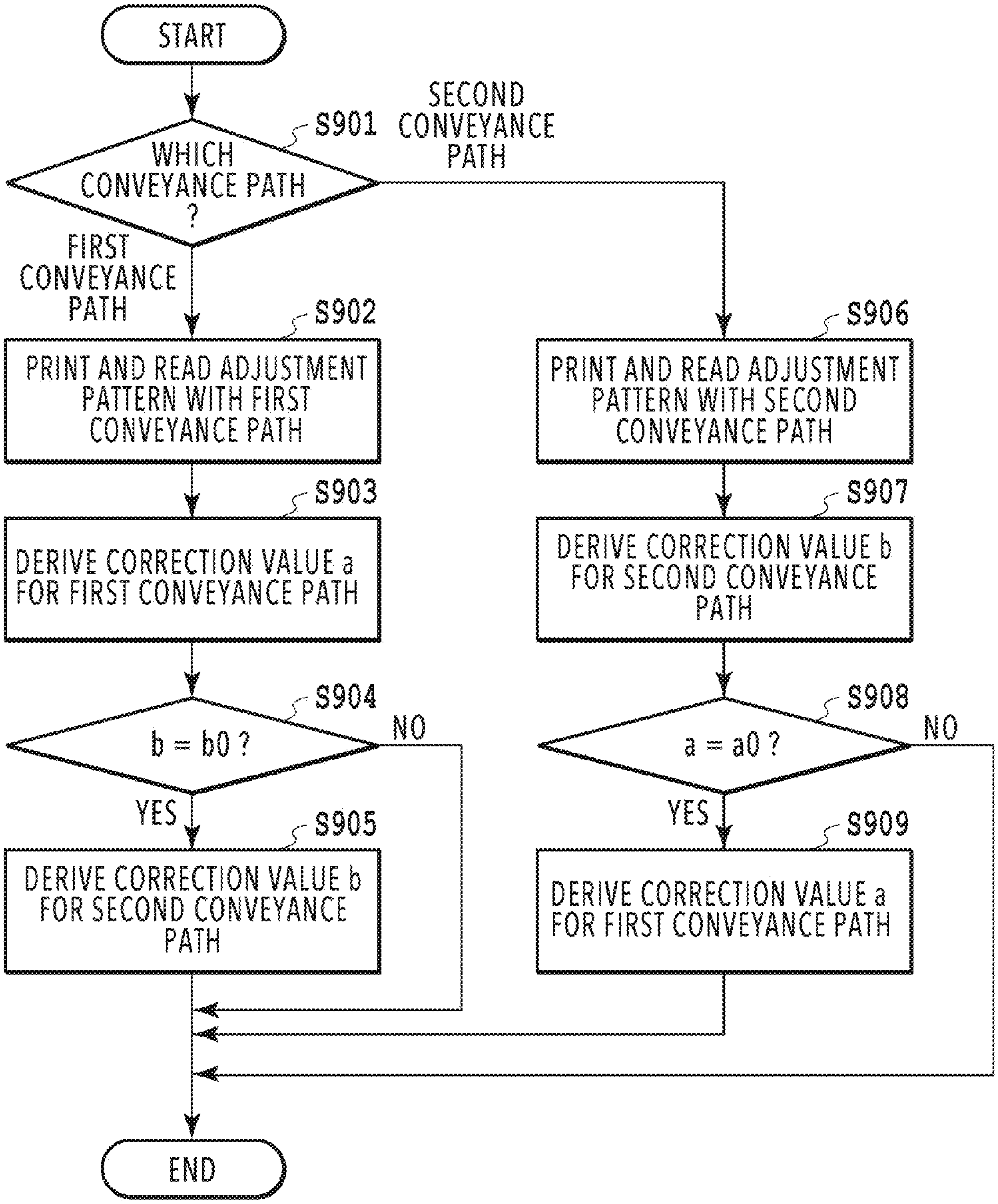
FIG. 9 is a flowchart for explaining a conveyance amount adjustment mode in the first embodiment.

FIG. 9 is a flowchart for explaining the conveyance amount adjustment mode in the present embodiment. The CPU 511 executes this process by controlling the mechanisms in the conveyance amount adjustment unit 590 explained in FIG. 4 in accordance with a program stored in the ROM 512 while using the RAM 513 as a work area. This process is started in response to the user pressing the adjustment mode execution switch 524 explained in FIG. 4 or issuing an instruction to execute the conveyance amount adjustment mode on a UI on the host apparatus 501. In the present embodiment, the user sets whether to use the first conveyance path or the second conveyance path to adjust the conveyance amount when issuing the instruction to execute the conveyance amount adjustment mode.

Upon start of this process, the CPU 511 firstly determines in S901 whether the adjustment is to be performed by using the first conveyance path or by using the second conveyance path. The CPU 511 proceeds to S902 if the first conveyance path has been set, and proceeds to S906 if the second conveyance path has been set.

In S902, the CPU 511 prints the adjustment pattern by using the first conveyance path and reads it. Specifically, the CPU 511 turns the flap 22 to the E2 side to thereby open the entrance to the discharge port 20. The CPU 511 then prints the adjustment pattern explained in FIGS. 6 and 7 onto the print medium. Specifically, the CPU 511 prints the reference patterns with the first printing scan, performs an operation of conveying the print medium by transmitting the reference instruction pulse value to the conveyance motor 561, and further prints the offset patterns with the second printing scan. Thereafter, the CPU 511 measures the optical densities of the seven patches by using the optical sensor 40.

In S903, the CPU 511 derives a correction value a for the first conveyance path and stores it in the memory. Specifically, the CPU 511 updates the correction value a for the first conveyance path. The method of deriving the correction value a is similar to the conventional method described using FIG. 5, and description thereof is therefore omitted here. In the memory in the present embodiment, a correction value a for the first conveyance path and a correction value b for the second conveyance path are stored as individual correction values. In S903, the CPU 511 updates only the correction value a for the first conveyance path.

In S904, the CPU 511 determines whether the correction value b for the second conveyance path currently stored in the memory is an initial value b0. If b=b0, the CPU 511 proceeds to S905, in which the CPU 511 derives a correction value b for the second conveyance path by using the correction value a for the first conveyance path obtained in S903 and stores it as the correction value for the second conveyance path in the memory by updating the initial value b0 with it. If determining that b≠b0, the CPU 511 does not update the correction value b for the second conveyance path and terminates this process.

On the other hand, if determining in S901 that the adjustment is set to be performed using the second conveyance path, the CPU 511 proceeds to S906, in which the CPU 511 prints the adjustment pattern by using the second conveyance path and reads it. Specifically, the CPU 511 turns the flap 22 to the E1 side to thereby close the entrance to the discharge port 20. The CPU 511 then prints the adjustment pattern explained in FIGS. 6 and 7 onto the print medium. Thereafter, the CPU 511 measures the optical densities of the seven patches by using the optical sensor 40.

In S907, the CPU 511 derives a correction value b for the second conveyance path and stores it in the memory. Specifically, the CPU 511 updates the correction value b for the second conveyance path. The method of deriving the correction value b is similar to the conventional method described using FIG. 5, and description thereof is therefore omitted here. In S907, the CPU 511 updates only the correction value b for the second conveyance path.

In S908, the CPU 511 determines whether the correction value a for the first conveyance path currently stored in the memory is an initial value a0. If a=a0, the CPU 511 proceeds to S909, in which the CPU 511 derives a correction value a for the first conveyance path by using the correction value b for the second conveyance path derived in S907 and stores it as the correction value for the first conveyance path in the memory by updating the initial value a0 with it. If determining in S908 that a≠a0, the CPU 511 does not update the correction value a for the first conveyance path and terminates this process.

FIG. 10 is a diagram for explaining how the correction values stored in the memory are updated. In the present embodiment, in the memory of the printing apparatus, there are prepared an area to store the correction value a for the first conveyance path and an area to store the correction value b for the second conveyance path. In FIG. 10, a correction value a0 and a correction value b0 are the correction value for the first conveyance path and the correction value for the second conveyance path set as the initial values at the time of shipping the printing apparatus 1, respectively. A correction value a1 is the correction value for the first conveyance path obtained via conveyance along the first conveyance path. A correction value b1 is the correction value for the second conveyance path derived based on the correction value a1. Also, a correction value b2 is the correction value for the second conveyance path obtained via conveyance along the second conveyance path. A correction value a2 is the correction value for the first conveyance path derived based on the correction value b2.

The correction values in FIG. 10 will be described below with reference to FIG. 9 again.

Assume, for example, that it is determined in S901 in FIG. 9 that the adjustment is to be performed using the first conveyance path and S902 to S905 are performed. In this case, in S903, the correction value a for the first conveyance path is updated with the correction value a1, which is a reliable correction value obtained via actual conveyance along the first conveyance path.

If it is then determined in S904 that the correction value b for the second conveyance path is the initial value b0, it is likely that the correction value for the second conveyance path has not been optimized. Thus, for the correction value b for the second conveyance path, the correction value b1, which is more reliable than the initial value b0, is derived based on the correction value a1 for the first conveyance path obtained by the adjustment performed this time. For example, the correction value b1 can be calculated using Equation 1.

$$b1 = b0 + (a1 - a0) \qquad \text{(Equation 1)}$$

By performing such a computation, it is possible to overwrite the correction value b for the second conveyance path with the value b1, which is more appropriate than the initial value b0, without performing an actual adjustment using the second conveyance path. On the other hand, if it is determined in S904 that the correction value b for the second conveyance path is not the initial value b0, it is likely that the correction value b for the second conveyance path has already been optimized. Thus, in this case, the stored current value is maintained.

Assume now that it is determined in S901 that the adjustment is to be performed using the second conveyance path and S906 to S909 are performed. In this case, in S907, the correction value b for the second conveyance path is updated with the correction value b2, which is a reliable correction value obtained via actual conveyance along the second conveyance path.

If it is then determined in S908 that the correction value a for the first conveyance path is the initial value a0, it is likely that the correction value for the first conveyance path has not been optimized. Thus, for the correction value a for the first conveyance path, the correction value a2, which is more reliable than the initial value a0, is derived based on the correction value b2 for the second conveyance path obtained by the adjustment performed this time. For example, the correction value a2 can be calculated using Equation 2.

$$a2 = a0 + (b2 - b0) \qquad \text{(Equation 2)}$$

By performing such a computation, it is possible to overwrite the correction value a for the first conveyance path with the value a2, which is more appropriate than the initial value a0, without performing an actual adjustment using the first conveyance path. On the other hand, if it is determined in S908 that the correction value a for the first conveyance path is not the initial value a0, it is likely that the correction value a for the first conveyance path has already been optimized. Thus, in this case, the stored current value is maintained.

In a case where an adjustment using the first conveyance path and an adjustment using the second conveyance path are both performed, the correction value a1 obtained by the adjustment with the first conveyance path is stored as the correction value a for the first conveyance path, and the correction value b2 obtained by the adjustment with the second conveyance path is stored as the correction value b for the second conveyance path.

Figure 11:
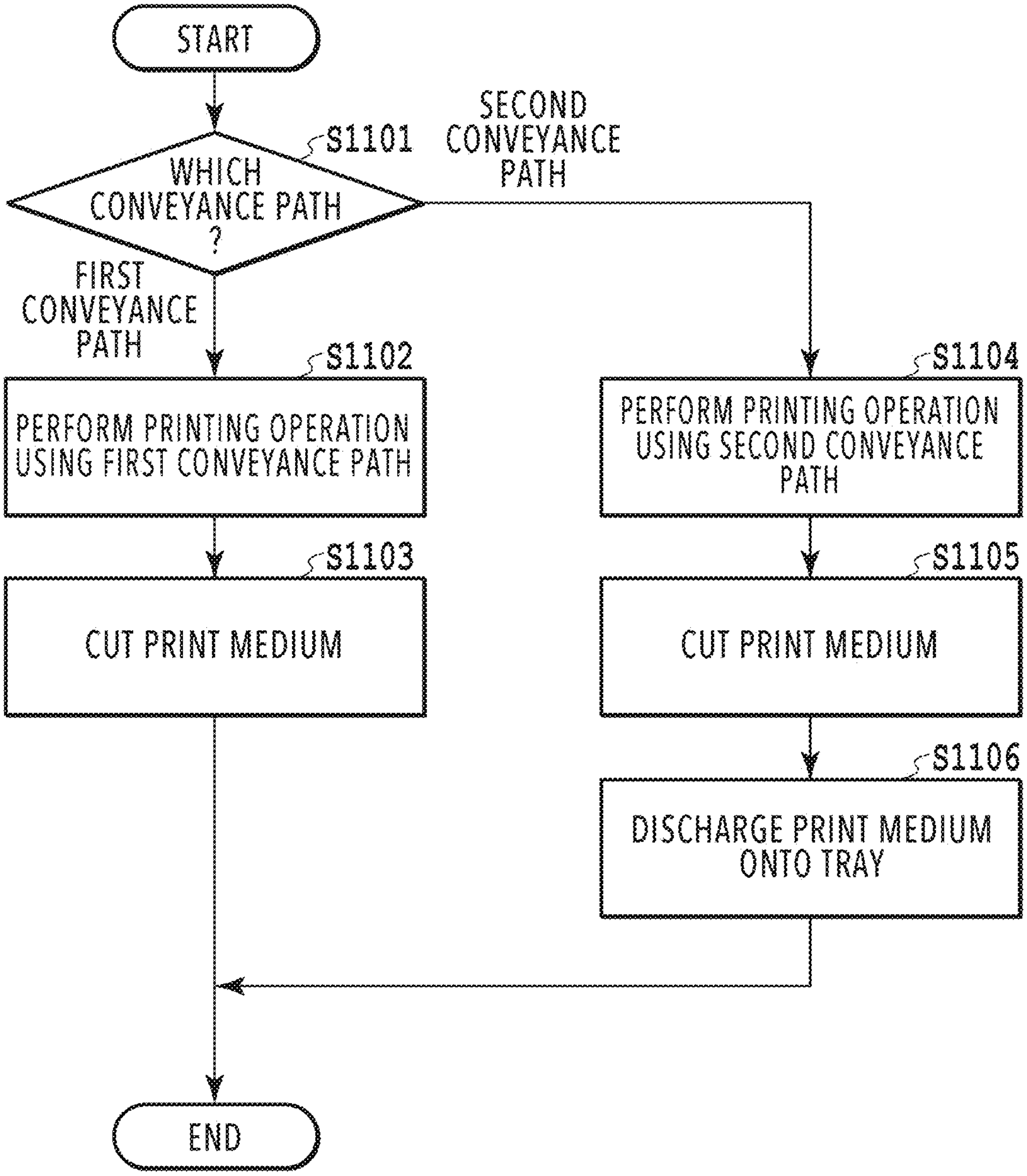
FIG. 11 is a flowchart for explaining a process executed in response to input of a print command.

FIG. 11 is a flowchart for explaining a process executed by the CPU 511 in response to input of a print command. The CPU 511 executes this process in accordance with a program stored in the ROM 512 while using the RAM 513 as a work area. In the present embodiment, whether to perform the printing process by using the first conveyance path or by using the second conveyance path is set in advance. Such a setting can be determined by the user via the operation panel 30 or a UI on the host apparatus 501 or by the CPU 511 according to the image quality, the print medium type, and the like.

Upon start of this process, the CPU 511 firstly determines in S1101 whether the printing is to be performed by using the first conveyance path or by using the second conveyance path. The CPU 511 proceeds to S1102 if the printing is set to be performed by using the first conveyance path, and the CPU 511 proceeds to S1104 if there is an instruction to perform the printing by using the second conveyance path.

In S1102, the CPU 511 performs a printing operation using the first conveyance path. Specifically, the CPU 511 turns the flap 22 to the E2 side to thereby open the entrance to the discharge port 20. Also, the CPU 511 corrects the instruction pulse value by using the correction value a for the first conveyance path currently stored in the memory. The CPU 511 then alternately repeats a printing scan with the print head 18 based on print data and a conveyance operation with the conveyance motor 561 based on the corrected instruction pulse value to thereby print an image onto the print medium S. After the last printing scan is completed, the CPU 511 conveys the trailing edge of the image to a position downstream of the cutter 21 and cuts the print medium S with the cutter 21 (S1103). The cut print medium S is discharged from the discharge port 20 by its own weight.

In S1104, on the other hand, the CPU 511 performs a printing operation using the second conveyance path. Specifically, the CPU 511 turns the flap 22 to the E1 side to thereby close the entrance to the discharge port 20. Also, the CPU 511 corrects the instruction pulse value by using the correction value b for the second conveyance path currently stored in the memory. The CPU 511 then alternately repeats a printing scan with the print head 18 based on the print data and a conveyance operation with the conveyance motor 561 and the sheet discharge motor 571 based on the corrected instruction pulse value to thereby print the image onto the print medium S. After the last printing scan is completed, the CPU 511 conveys the trailing edge of the image to the position downstream of the cutter 21 and cuts the print medium S with the cutter 21 (S1105).

Then in S1106, the CPU 511 continues driving the sheet discharge motor 571 to thereby discharge the cut print medium S onto the stacker 28.

According to the present embodiment described above, in the case of using the first conveyance path and in the case of using the second conveyance path, the print medium can be conveyed by respective appropriate conveyance amounts based on respective appropriate instruction pulse values. This enables printing of a high-quality image without a black or white stripe due to a conveyance error.

Incidentally, in the above, a description has been given of a configuration in which a conveyance operation is performed by driving both the conveyance motor 561 and the sheet discharge motor 571 in the case where the second conveyance path is set to be used. However, the sheet discharge motor 571 does not necessarily have to be driven in S906 and S1104. As long as the flap 22 closes the entrance to the discharge port 20, the print medium S is moved to the second conveyance path only by the driving force of the conveyance motor 561, without driving the sheet discharge motor 571. In this case too, the appropriate correction value for the second conveyance path, through which the print medium S is conveyed upward, is different from the appropriate correction value for the first conveyance path, through which the print medium S is conveyed substantially horizontally. Thus, the present embodiment, in which these correction values are individually stored and managed, functions effectively.

Second Embodiment

In the printing apparatus 1 illustrated in FIGS. 2A and 2B, the conveyance condition for the print medium S in the second conveyance path is different before and after it is nipped by the roller pair of the sheet discharge roller 25 and the sheet discharge nip roller 26. Accordingly, the optimal correction value is assumed to be different before and after the print medium S is nipped by the above nip section. With the above point taken into account, in the present embodiment, the second conveyance path is divided into two sections at the nip section with the sheet discharge roller 25 and the sheet discharge nip roller 26 as the boundary, and an appropriate correction value is set for each section.

Figure 12:
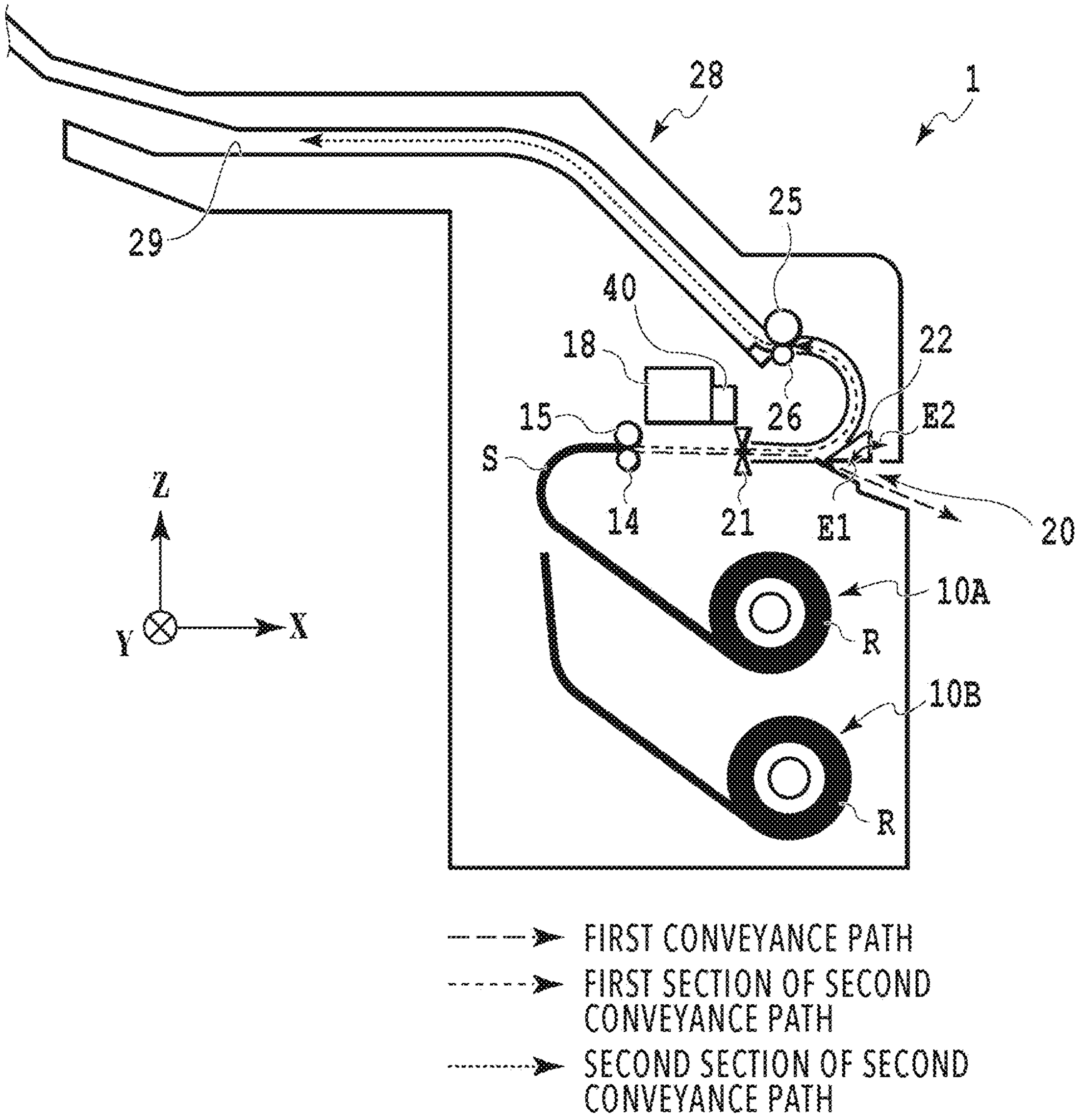
FIG. 12 is a diagram for explaining conveyance paths and sections in the second embodiment.

FIG. 12 is a diagram for explaining the conveyance paths and the sections in the present embodiment. In the present embodiment, in the second conveyance path, the section from the conveyance roller 14 to the sheet discharge roller 25 is defined as a first section, and the further downstream section from the sheet discharge roller 25 is a defined as second section. While the leading edge of the print medium S is in the first section, the print medium S is conveyed only by the conveyance motor 561. While the leading edge of the print medium S is in the second section, the print medium S is conveyed by cooperation of the conveyance motor 561 and the sheet discharge motor 571.

Figure 13:
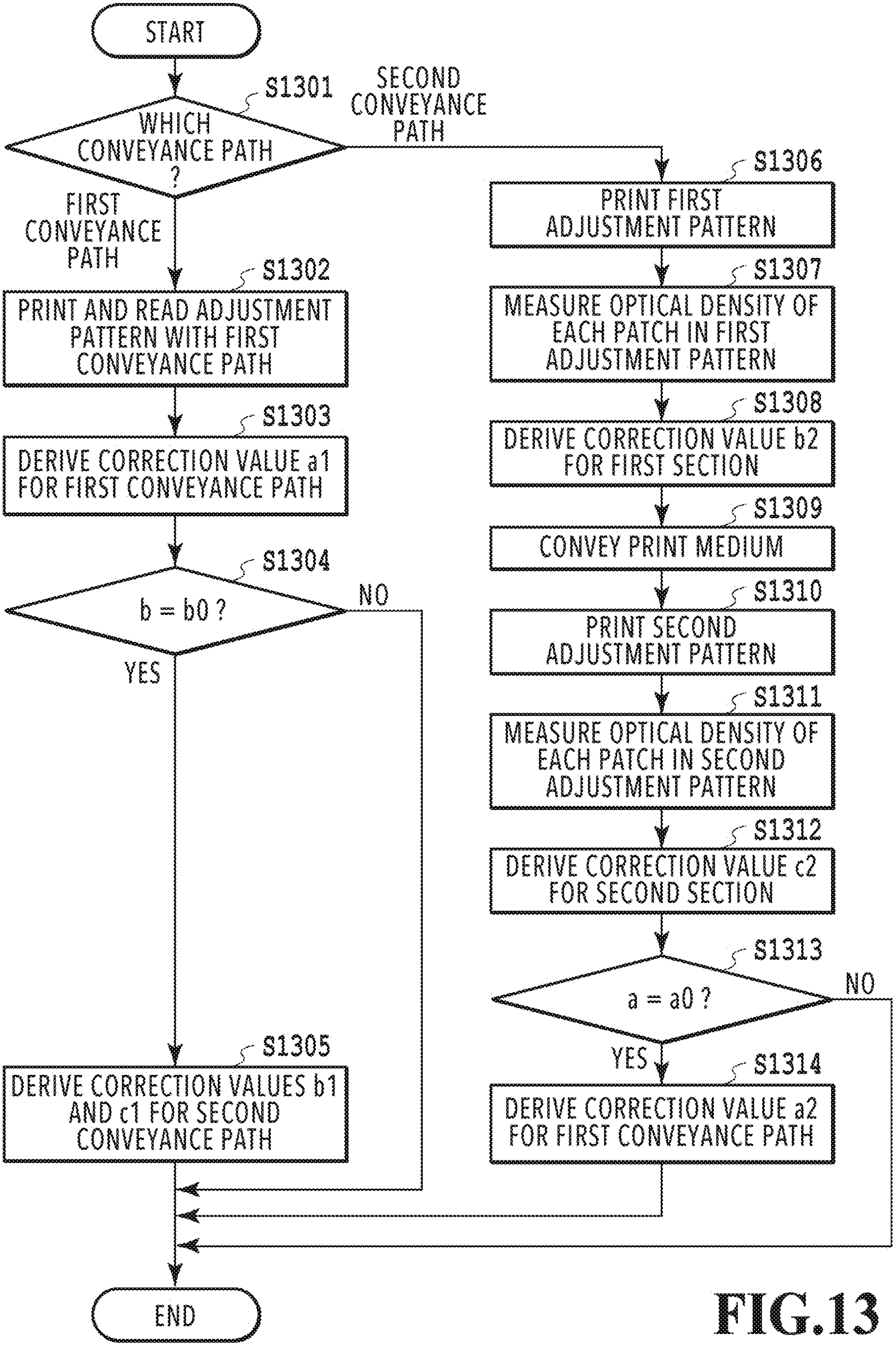
FIG. 13 is a flowchart for explaining a conveyance amount adjustment mode in the second embodiment.

FIG. 13 is a flowchart for explaining the conveyance amount adjustment mode in the present embodiment. S1301 to S1305 in FIG. 13 are similar to S901 to S905 in FIG. 9 described in the first embodiment, and description thereof is therefore omitted here. Note, however, that the correction value b derived in S1305 by the CPU 511 is the correction value for the first section of the second conveyance path. The CPU 511 stores the correction value b for the first section in the memory and, as for a correction value c for the second section, maintains its current value.

In S1306, the CPU 511 prints a first adjustment pattern onto the print medium S. Specifically, the CPU 511 turns the flap 22 to the E1 side to thereby close the entrance to the discharge port 20. Also, the CPU 511 conveys the print medium S to a position where printing can be performed by the print head 18. The CPU 511 then prints the adjustment pattern explained in FIGS. 6 and 7 onto the print medium.

In S1307, the CPU 511 measures the optical density of each patch included in the first adjustment pattern printed in S1306 by using the optical sensor 40.

In S1308, the CPU 511 derives a correction value b2 for the first section and stores it in the memory. The method of deriving the correction value b2 is similar to the conventional method described using FIG. 5, and description thereof is therefore omitted here.

In S1309, the CPU 511 conveys the print medium S until its leading edge is located in the second section.

In S1310, the CPU 511 prints a second adjustment pattern onto the print medium. As with the first adjustment pattern, the second adjustment pattern is also the pattern explained in FIGS. 6 and 7.

In S1311, the CPU 511 measures the optical density of each patch included in the second adjustment pattern printed in S1310 by using the optical sensor 40.

In S1312, the CPU 511 derives a correction value c2 for the second section and stores it in the memory. The method of deriving the correction value c2 is similar to the conventional method described using FIG. 5, and description thereof is therefore omitted here.

In S1313, the CPU 511 determines whether the correction value a for the first conveyance path currently stored in the memory is the initial value a0. If a=a0, the CPU 511 proceeds to S1314, in which the CPU 511 derives the correction value a2 for the first conveyance path by using the correction value b2 for the first section of the second conveyance path derived in S1308 and stores it in the memory. If determining in S1313 that a≠a0, the CPU 511 does not update the correction value a for the first conveyance path and terminates this process.

Figure 14:
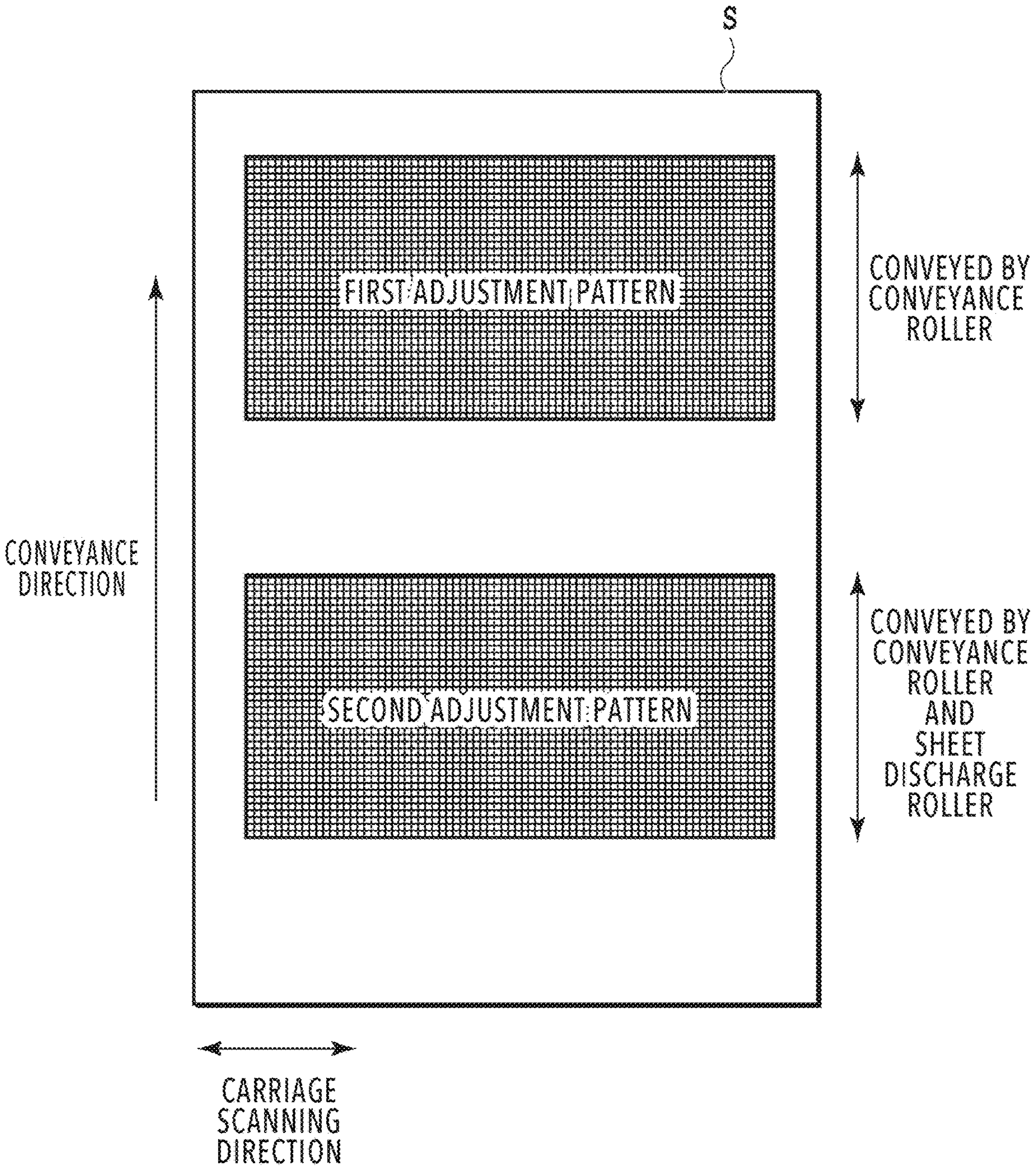
FIG. 14 is a diagram illustrating adjustment patterns in an adjustment using a second conveyance path.

FIG. 14 is a diagram illustrating the adjustment patterns printed onto the print medium S in response to an instruction to perform the adjustment using the second conveyance path in the second embodiment. On the print medium S after being cut, the first adjustment pattern and the second adjustment pattern, which are the same content, are printed on a downstream side and an upstream side in the conveyance direction, respectively. During the printing operation for the first adjustment pattern, the leading edge of the print medium S is present upstream of the sheet discharge roller 25. During the printing operation for the second adjustment pattern, the leading edge of the print medium S is present downstream of the sheet discharge roller 25. Incidentally, in the present embodiment, the adjustment patterns illustrated in FIG. 14 may be printed in S1302, which is performed for the adjustment using the first conveyance path. In this case, the first and second adjustment patterns are both printed under substantially the same condition. Thus, the correction value a1 may be derived by using only one of the adjustment patterns or by using an average of the two adjustment patterns.

FIG. 15 is a diagram for explaining how the correction values are updated in the present embodiment. In the present embodiment, in the memory of the printing apparatus 1, there are prepared an area to store the correction value a for the first conveyance path, an area to store the correction value b for the first section of the second conveyance path, and an area to store the correction value c for the second section of the second conveyance path. In FIG. 15, correction values a0, b0, and c0 are correction values set as the initial values at the time of shipping the printing apparatus 1. The correction value a1 is the correction value for the first conveyance path obtained via conveyance along the first conveyance path. The correction value b1 is the correction value for the first section of the second conveyance path derived based on the correction value a1. Further, the correction values b2 and c2 are the correction values for the first and second sections obtained via conveyance along the second conveyance path, respectively. Furthermore, the correction value a2 is the correction value for the first conveyance path derived based on the correction value b2. The correction values in FIG. 15 will be described below with reference to FIG. 13 again.

Assume, for example, that it is determined in S1301 in FIG. 13 that the adjustment is to be performed using the first conveyance path and S1302 to S1305 are performed. In this case, in S1303, the correction value a for the first conveyance path is updated with the correction value a1, which is a reliable correction value obtained via actual conveyance along the first conveyance path.

If it is then determined in S1304 that the correction value b for the first section of the second conveyance path is the initial value b0, it is likely that the correction value b for the first section of the second conveyance path has not been optimized. Thus, a correction value is calculated in accordance with Equation 1 with the correction value a1 for the first conveyance path obtained by the adjustment performed this time, and the correction value b for the first section of the second conveyance path is updated with it. On the other hand, as for the correction value c for the second section, it may not be possible to derive an appropriate correction value even by using the correction value a1 obtained with the first conveyance path, which uses only the conveyance motor 561 as the driving source. For this reason, the correction value c for the second section is maintained as is at the current value.

If it is determined in S1304 that the correction value b for the first section of the second conveyance path is not the initial value b0, it is likely that the correction value b for the first section has already been optimized. Thus, in this case, the stored correction value b is maintained.

Assume now that it is determined in S1301 that the adjustment is to be performed using the second conveyance path and S1306 to S1314 are performed. In this case, the correction value b for the first section and the correction value c for the second section are updated with the correction values b2 and c2, respectively, which are reliable correction values obtained via actual conveyance along the second conveyance path.

If it is then determined in S1313 that the correction value a for the first conveyance path is the initial value a0, it is likely that the correction value a for the first conveyance path has not been optimized. Thus, the correction value a for the first conveyance path is calculated in accordance with Equation 2 described in the first embodiment with the correction value b2 for the first section of the second conveyance path. On the other hand, if it is determined in S1313 that the correction value a for the first conveyance path is not the initial value a0, it is likely that the correction value a for the first conveyance path has already been optimized. Thus, in this case, the stored correction value a is maintained.

In a case where an adjustment using the first conveyance path and an adjustment using the second conveyance path are both performed, the correction value a1 obtained by the adjustment with the first conveyance path is stored as the correction value a for the first conveyance path. As for the second conveyance path, the correction values b2 and c2 obtained by the adjustment with the second conveyance path are stored for the first and second sections, respectively.

In a case where a print command is subsequently input into the printing apparatus 1, the CPU 511 performs a printing operation in a similar manner to the first embodiment by following the flowchart in FIG. 11. However, in a case where the printing is set to be performed using the second conveyance path, then in S1104, the CPU 511 performs a conveyance operation based on the correction value b for the first section while the leading edge of the print medium S is present in the first section and performs a conveyance operation based on the correction value c for the second section while the leading edge is present in the second section.

In the above, the correction value c for the second section is maintained at the current value in the case where the adjustment is performed using the first conveyance path. Note, however, that the present embodiment is not limited to such a configuration. In a case where a correction value with a certain degree of reliability can be expected to be derived based on the correction value a1 for the first conveyance path, an appropriate equation or the like may be prepared for a correction value c1 for the second section. In this case, the equation to derive the correction value c1 from the correction value a1 may be varied according to the print medium type and the like.

According to the present embodiment described above, for each of the first and second sections of the second conveyance path, a more appropriate correction value than that in the first embodiment can be set. This enables printing of a high-quality image with no stripe in the case of performing the printing with the first conveyance path and in the case of performing the printing with the second conveyance path.

Third Embodiment

In the second embodiment, the second conveyance path is divided into the first and second sections, and an appropriate correction value is prepared for each section. Unlike this, in the present embodiment, the second conveyance path is further divided to form a section around the sheet discharge roller 25 as a third section, and an appropriate correction value is prepared for each of the first, second, and third sections.

Figure 16:
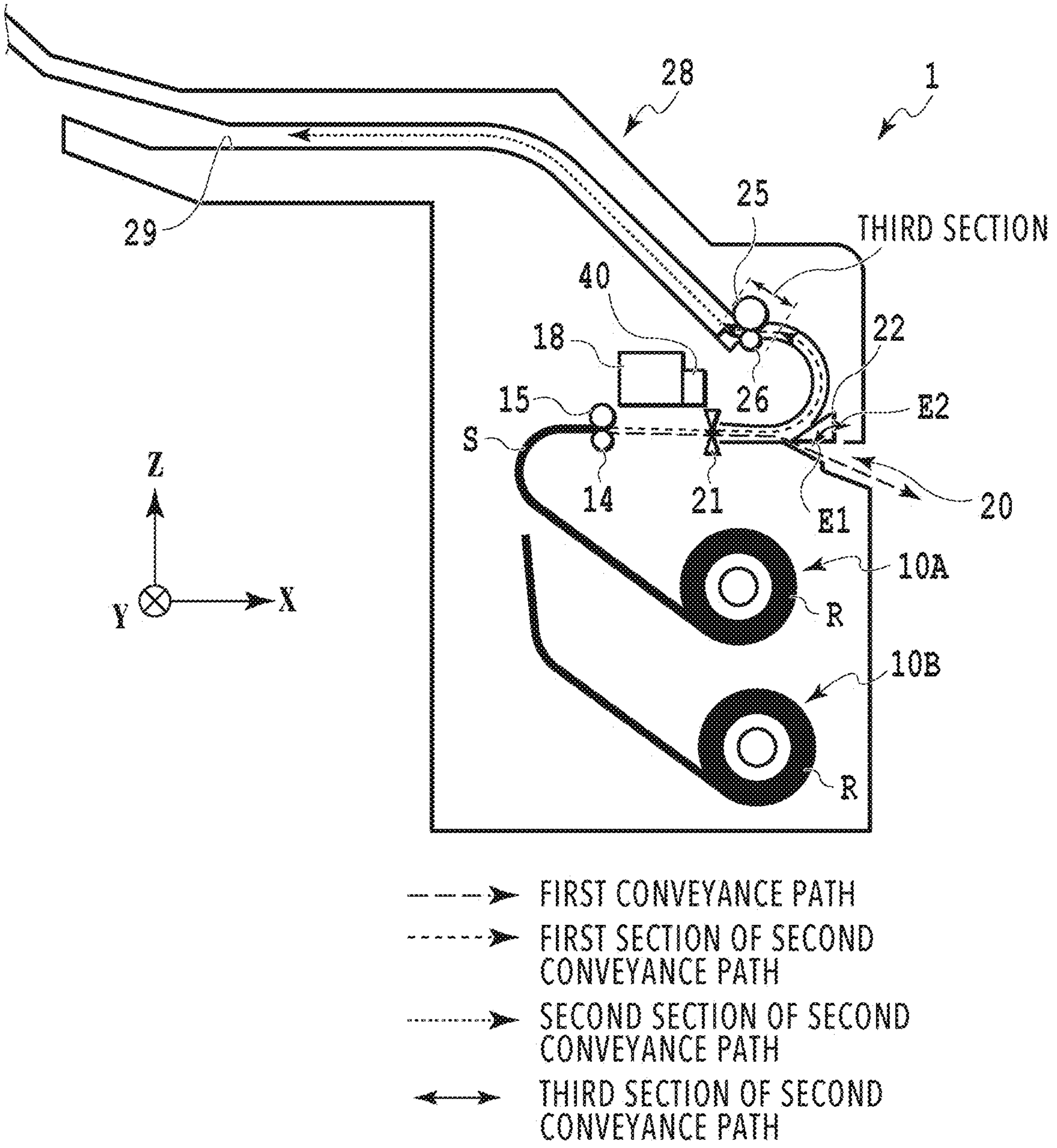
FIG. 16 is a diagram for explaining conveyance paths and sections in the third embodiment.

FIG. 16 is a diagram for explaining the conveyance paths and the sections in the present embodiment. In the present embodiment, a predetermined section including the sheet discharge roller 25 is defined as the third section. The section from the conveyance roller 14 to the near side of the third section is defined as the first section, and the section downstream of the third section is defined as the second section.

Figure 17:
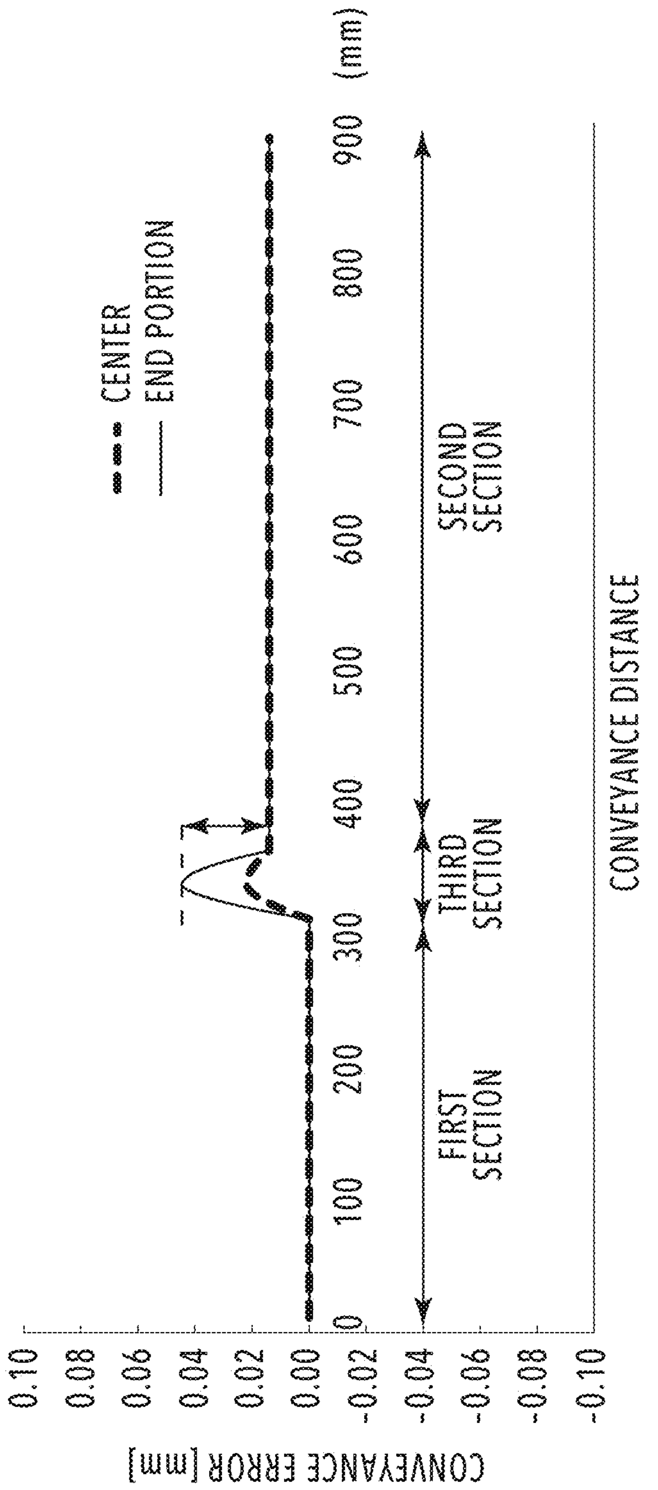
FIG. 17 is a diagram for explaining the conveyance amount in each section.

FIG. 17 is a diagram for explaining the conveyance amount in each of the first to third sections. In FIG. 17, the horizontal axis represents the distance by which the leading edge of the print medium S is conveyed after passing the conveyance roller 14. Also, the vertical axis represents the conveyance error from the target conveyance amount (13.55 mm) in a case of performing a conveyance operation based on the correction value b2 for the first section. In FIG. 17, the conveyance errors at a center portion and an end portion of the print medium S in the width direction (Y direction) are illustrated in a comparative manner.

In the case of performing a conveyance operation based on the correction value b, a state with no conveyance error is maintained in the first section. In the second section, the conveyance amount tends to be larger since the sheet discharge motor 571 is used in addition to the conveyance motor 561. Accordingly, the conveyance amount becomes larger than the target conveyance amount in a case where the conveyance operation is performed based on the correction value b, which is appropriate for the first section. FIG. 17 illustrates a state where the conveyance amount is larger than the target conveyance amount by about 0.01 mm.

In the third section, on the other hand, the conveyance amount instantaneously becomes large when the leading edge of the print medium S gets nipped by the sheet discharge roller 25 and the sheet discharge nip roller 26. This error is larger at the end portion than at the center portion and, at the end portion, the conveyance amount is larger than the target conveyance amount by about 0.04 mm. A white stripe appears in the image in a case where the actual conveyance amount is larger than the target conveyance amount as above.

Here, it is difficult to figure out the timing at which the conveyance amount abruptly becomes large, i.e., the timing at which the leading edge of the print medium gets nipped by the sheet discharge roller 25 and the sheet discharge nip roller 26, and appropriately correct the conveyance amount at this timing. For this reason, in the present embodiment, the correction value is switched from the correction value b for the first section to the correction value c for the second section when the leading edge of the print medium enters the third section, without the leading edge being nipped by the sheet discharge roller 25 and the sheet discharge nip roller 26.

FIG. 18 is a diagram for explaining how the correction values are updated in the present embodiment. For the second conveyance path, there are prepared areas to store the correction value b for the first section, the correction value c for the second section, and a correction value d for the third section, respectively.

The method of deriving the correction value a for the first conveyance path and the correction values b and c for the first and second sections of the second conveyance path is similar to that in the second embodiment. The correction value d for the third section of the second conveyance path is always set at the same value as the correction value c for the second section. Specifically, an initial value d0 is equal to c0. The current value is maintained in the case where an adjustment using the first conveyance path is performed, while the same value as the correction value c2 for the second section is set in the case where an adjustment using the second conveyance path is performed.

Figure 19:
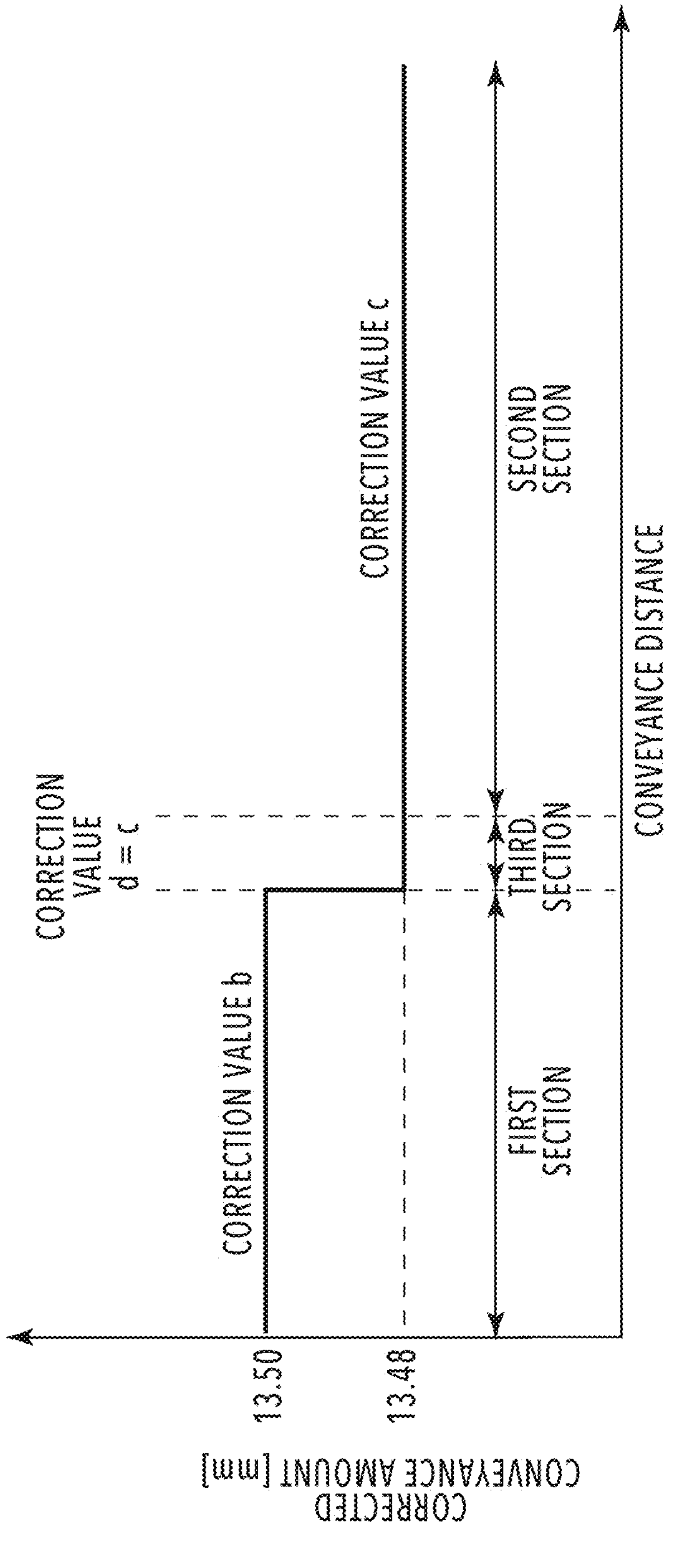
FIG. 19 is a diagram for explaining the switching of a correction value in the third embodiment.

FIG. 19 is a diagram for explaining the switching of the correction value within the second conveyance path in the present embodiment. The horizontal axis represents the distance by which the leading edge of the print medium S is conveyed after passing the conveyance roller 14, and the vertical axis represents a corrected conveyance amount. Here, the corrected conveyance amount is a value correlated to a corrected instruction pulse value and is a conveyance amount set in order to achieve the target conveyance amount. For example, in the first section, command pulses corresponding to a conveyance amount of 13.50 mm are transmitted to achieve the target conveyance amount of 13.55 mm. In the second section, command pulses corresponding to a conveyance amount of 13.48 mm are transmitted to achieve the target conveyance amount of 13.55 mm.

In the present embodiment, the correction value during conveyance is switched from the correction value b for the first section to the correction value c for the second section when the leading edge of the print medium S enters the third section, without the leading edge of the print medium S being nipped by the sheet discharge roller 25 and the sheet discharge nip roller 26. In this case, there is a possibility that the actual conveyance amount is smaller than the target conveyance amount and a black stripe appears particularly at a center portion of the print medium in the width direction. Nonetheless, such a black stripe is not more visually noticeable than a white stripe that appears in the case where the actual conveyance amount is larger than the target conveyance amount, and is not likely to be problematic in the image. Thus, in the present embodiment, the conveyance amount in the third section, at which the conveyance amount tends to be unstable, is set small.

According to the present embodiment described above, it is possible to set an appropriate correction value for the conveyance amount in each of the first and second sections of the second conveyance path. In addition to this, the conveyance amount in the third section, at which the leading edge of the print medium S enters the nip section with the sheet discharge roller, can be adjusted so as to prevent formation of a white stripe. This enables printing of a high-quality image with no stripe in the case of performing the printing with the first conveyance path and in the case of performing the printing with the second conveyance path.

Fourth Embodiment

In the third embodiment, the configuration is such that the correction value for the third section, which includes the nip section with the sheet discharge roller 25 and the sheet discharge nip roller 26, is set equal to that for the second section. However, in a case where there is a large difference in correction value, i.e., corrected conveyance amount, between the first and second sections, it may not be possible to appropriately correct the conveyance amount in the third section with the method in the third embodiment.

Figure 20A:
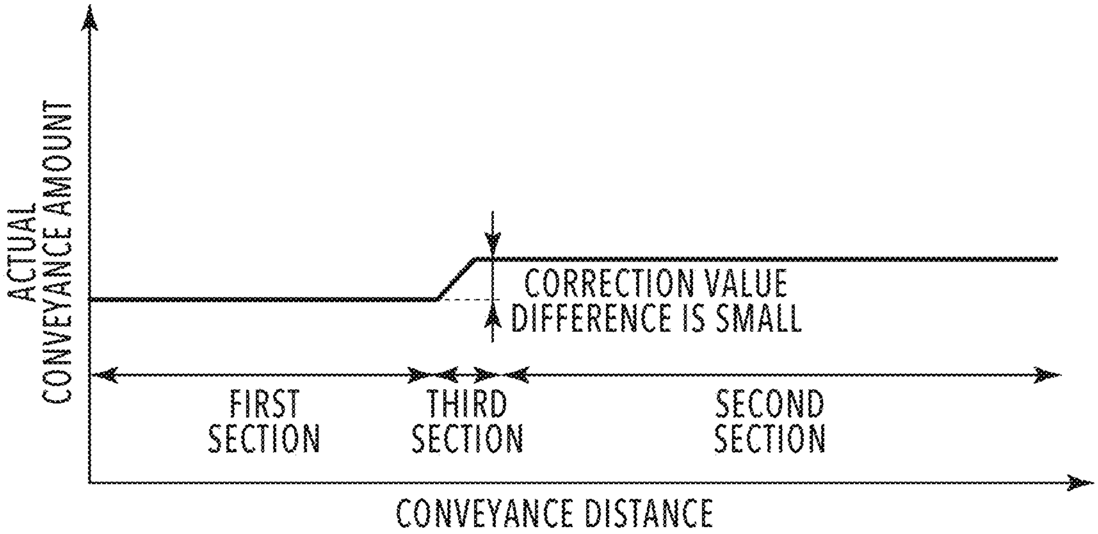
FIGS. 20A and 20B are diagrams illustrating how an actual conveyance amount changes in a case where fixed corrected conveyance amounts are used.
Figure 20B:
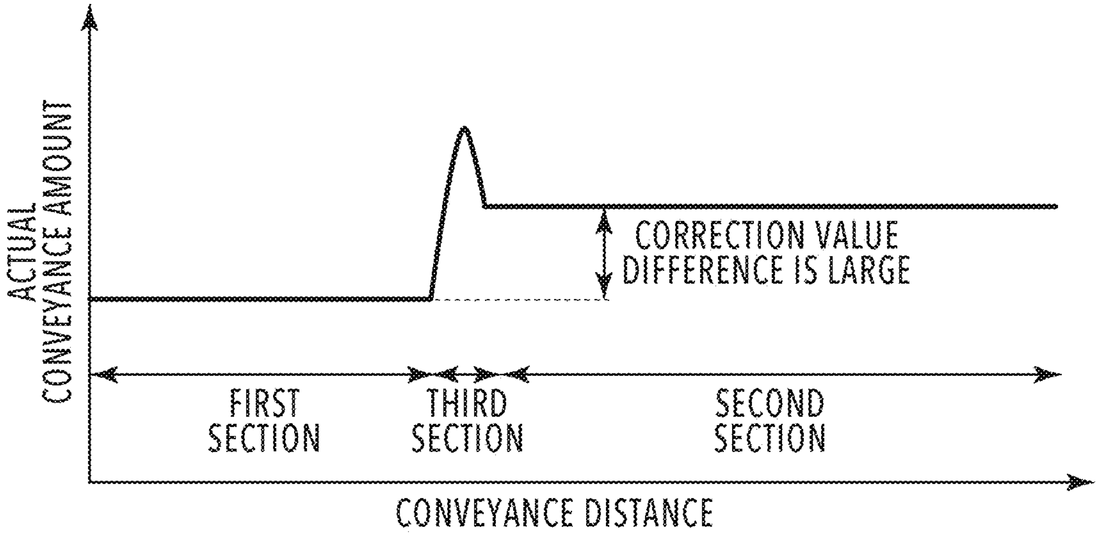

FIGS. 20A and 20B are diagrams illustrating how the actual conveyance amount changes in cases where the conveyance operation is performed with fixed corrected conveyance amounts. FIG. 20A illustrates a case where the difference between the correction value for the first section and the correction value for the second section is small. FIG. 20B illustrates a case where the difference between the correction value for the first section and the correction value for the second section is large.

In the case where the difference between the correction value for the first section and the correction value for the second section is small, that is, the actual conveyance amount is not greatly different before and after the application of the driving force of the sheet discharge motor 571, the actual conveyance amount changes gently in the third section, as illustrated in FIG. 20A. Thus, the appearance of a white stripe can be prevented by setting the corrected conveyance amount in the third section at the same amount as that in the second section, as with the third embodiment.

On the other hand, in the case where the difference between the correction value for the first section and the correction value for the second section is large, that is, the actual conveyance amount is greatly different before and after the application of the driving force of the sheet discharge motor, the conveyance amount changes more greatly at the timing at which the print medium S gets nipped by the sheet discharge roller 25 and the sheet discharge nip roller 26. In other words, there is a region in the third section at which the conveyance amount abruptly becomes large, as can be seen from FIG. 20B. In this case, setting the corrected conveyance amount in the third section at the same amount as that in the second section cannot reliably prevent the appearance of a white stripe. In the present embodiment, a method of performing an appropriate correction under a conveyance condition as illustrated in FIG. 20B will be described.

Figure 21:
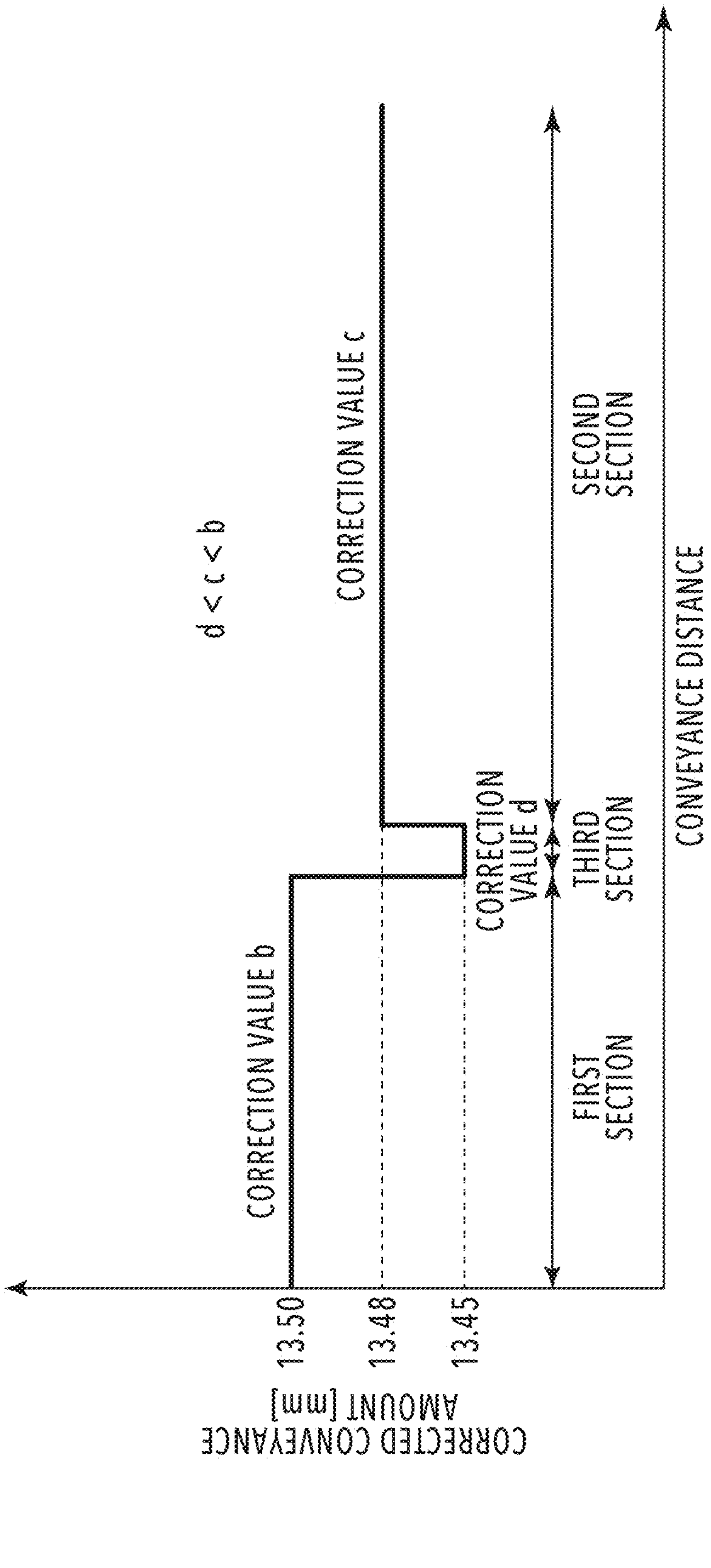
FIG. 21 is a diagram for explaining the switching of a correction value in the fourth embodiment.

FIG. 21 is a diagram for explaining the switching of the correction value within the second conveyance path in the present embodiment. The horizontal axis represents the distance by which the leading edge of the print medium S is conveyed after passing the conveyance roller 14, and the vertical axis represents the corrected conveyance amount. In the present embodiment, the correction value d for the third section is set at a value smaller than the correction value c for the second section. FIG. 21 illustrates an example in which the corrected conveyance amount in the first section is set at 13.50 mm, the corrected conveyance amount in the second section is set at 13.48 mm, and the corrected conveyance amount in the third section is set at 13.45 mm. By setting the corrected conveyance amount in the third section at a value smaller than that in the second section as above, it is possible to more reliably prevent the formation of a white stripe at the third section.

Note that in the present embodiment, it is difficult to directly derive the corrected conveyance amount and the correction value for the third section by means of the conveyance amount adjustment mode using the second conveyance path. For this reason, in the present embodiment, an appropriate threshold value s and coefficient k are prepared in advance, and the correction value d for the third section is calculated using them.

Specifically, in a case where the difference between the correction value b2 for the first section and the correction value c2 for the second section obtained by the conveyance amount adjustment mode using the second conveyance path is larger than the threshold value s (b2−c2>s), a correction value d2 for the third section is derived from Equation 3.

$$d2 = c2 + k \times (c2 - b2) \qquad \text{(Equation 3)}$$

Let, for example, k=1.7 and s=6 in a case where b2=−19 and c2=−26. Then, $$d2 = -26 + 1.7 \times (-26 - (-19)) \cong -38.$$

In this case, the instruction pulse value for the third section is $$5120 - 38 = 5082.$$

Thus, a corrected conveyance amount L is $$L = 13.33 \text{ mm} \times 5082/5120 = 13.45 \text{ mm}.$$

FIG. 21 illustrates such a case.

According to the present embodiment described above, in a situation where the difference between the correction value for the first section and the correction value for the second section is large and a white stripe tends to appear abruptly, the appearance of the white stripe can be reliably prevented by setting the corrected conveyance amount in the third section at an appropriate value.

Other Embodiments

In the above, a description has been given by taking a printing apparatus, as an example, which includes a first conveyance path for front discharge and a second conveyance path for top discharge, as explained in FIGS. 2A and 2B. However, the conveyance path configuration is not limited to the configuration in FIGS. 2A and 2B. The above embodiments effectively function also with, for example, a printing apparatus including a conveyance path along which a print medium S is fed from the front and discharged from the front and a conveyance path along which a print medium S is fed from the back and discharged from the front, since the conveyance condition for the print medium S is different between these conveyance paths. Also, the printing apparatus may include three or more conveyance paths. In this case, a correction value obtained by using one conveyance path may be used to derive a correction value for each of the other conveyance paths.

Also, in the above, the differences between the reference instruction pulse value (5120) and the instruction pulse values corresponding to the corrected conveyance amounts are stored as the correction values in the memory. However, the corrected instruction pulse values may be stored in the memory. Either way, it is only necessary to store information with which, in response to input of an actual print command, a conveyance operation can be performed along either one of the conveyance paths with an appropriate corrected conveyance amount, i.e., an appropriate driving amount. Moreover, the configuration only needs to be such that the CPU can use the information on the one of the conveyance paths stored in the memory to derive the information on the other conveyance path.

Also, in the above, the adjustment pattern is printed using the black nozzle array. However, the adjustment pattern may be printed using another ink color. Moreover, a description has been given by taking, as an example, the adjustment pattern with seven patches arrayed in the main scanning direction. However, the number of patches and their layout can be changed as appropriate. For example, a plurality of patch arrays each being a plurality of patches arrayed in the main scanning direction may be printed side by side in the conveyance direction.

Also, in the above, a description has been given of a configuration in which the optical sensor provided downstream of the print head is used to measure the optical density of the adjustment pattern printed by the print head. However, it is not an essential requirement to include the optical sensor. The configuration may be such that a reading device provided separate from the printing apparatus reads density data on the adjustment pattern printed by the print head on a print medium set on that reading device, and an appropriate correction value is derived for each conveyance path based on the density data. Alternatively, the configuration may be such that the user visually checks a print medium with the adjustment pattern printed thereon and inputs the patch number of the patch with the lowest density via the operation panel.

Also, in the above, Equation 1 is used to derive the correction value b1 for the second conveyance path in the case of performing an adjustment using the first conveyance path, and Equation 2 is used to derive the correction value a2 for the first conveyance path in the case of performing an adjustment using the second conveyance path. Here, the contents of the equations can of course be changed as appropriate. In this case, since the conveyance amount varies also by the print medium type and size, each equation may be prepared for each individual print medium type and size.

Also, S904 and S908 in FIG. 9 and S1304 and S1313 in FIG. 13 do not necessarily have to be steps of comparing the current value with the initial value. Each of these steps only needs to be capable of determining whether the correction value a for the first conveyance path or the correction value b for the second conveyance path has been optimized at present. For example, in the above steps, it may be determined whether the conveyance amount adjustment mode has previously been executed. In this case, in S904 in FIG. 9 and S1304 in FIG. 13, it may be determined whether the conveyance amount adjustment mode using the second conveyance path has previously been executed and, if not, the processes may proceed to S905 and S1305, respectively. Also, in S908 in FIG. 9 and S1313 in FIG. 13, it may be determined whether the conveyance amount adjustment mode using the first conveyance path has previously been executed and, if not, the processes may proceed to S909 and S1314, respectively.

Also, in the above steps, whether it is necessary to update the respective correction values may be determined based on the elapsed time since the last execution of the conveyance amount adjustment mode. In this case, if it is determined in S904 in FIG. 9 and S1304 in FIG. 13 that the elapsed time since the last execution of the conveyance amount adjustment mode using the second conveyance path has exceeded a predetermined threshold value, the processes may proceed to S905 and S1305, respectively. Also, if it is determined in S908 in FIG. 9 and S1313 in FIG. 13 that the elapsed time since the last execution of the conveyance amount adjustment mode using the first conveyance path has exceeded a predetermined threshold value, the processes may proceed to S909 and S1314, respectively.

Further, in the above, a description has been given by taking, as an example, a print head including electrothermal conversion elements as its printing elements. However, another type of element, such as a piezoelectric element, may be employed as each printing element. Furthermore, the printing method is not limited to an inkjet method, and a thermal transfer method or an electrophotographic method may be employed.

Embodiment(s) of the present invention can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2020-165459, filed Sep. 30, 2020, which is hereby incorporated by reference herein in its entirety.

What is claimed is:

1. A printing apparatus comprising:

a conveyance roller configured to convey a sheet in a conveyance direction;

a printing unit configured to print an image onto a sheet conveyed by the conveyance roller;

a first conveyance path provided downstream of the printing unit in the conveyance direction and configured to discharge a sheet on which an image is printed by the printing unit;

a second conveyance path, which is different from the first conveyance path, provided downstream of the printing unit in the conveyance direction and configured to discharge a sheet on which an image is printed by the printing unit; and a control unit configured to perform control so that:

in a case of conveying a sheet along the first conveyance path, the sheet is conveyed by the conveyance roller with a first conveyance amount, and in a case of conveying a sheet along the second conveyance path, the sheet is conveyed by the conveyance roller with a second conveyance amount different from the first conveyance amount, wherein the control unit executes a first mode in which the control unit controls conveyance of a sheet along the first conveyance path using the conveyance roller and obtains a first correction value for the first conveyance amount, and a second mode in which the control unit controls conveyance of a sheet along the second conveyance path using the conveyance roller and obtains a second correction value for the second conveyance amount.

2. The printing apparatus according to claim 1, wherein the control unit derives the second correction value based on the first correction value.

3. The printing apparatus according to claim 1, further comprising a discharge roller provided downstream of the conveyance roller on the second conveyance path and configured to convey a sheet, wherein the control unit changes a conveyance amount of a sheet between a case in which a leading edge of the sheet is between the discharge roller and the conveyance roller and a case in which the leading edge of the sheet is downstream of the discharge roller.

4. The printing apparatus according to claim 3, further comprising a stacker configured to stack sheets conveyed by the discharge roller.

5. The printing apparatus according to claim 3, further comprising a first motor configured to drive the conveyance roller and a second motor configured to drive the discharge roller.

6. The printing apparatus according to claim 1, further comprising a sheet feed unit configured to feed a sheet from a roll, wherein the conveyance roller conveys a sheet fed by the sheet feed unit.

7. The printing apparatus according to claim 6, further comprising a cutter configured to cut a sheet.

8. The printing apparatus according to claim 1, further comprising a discharge port configured to discharge a sheet conveyed along the first conveyance path.

9. The printing apparatus according to claim 1, further comprising a flap configured to switch between conveyance of a sheet along the first conveyance path and conveyance of a sheet along the second conveyance path.

10. The printing apparatus according to claim 1, wherein the printing unit comprises a printing head configured to eject ink onto a sheet.

11. The printing apparatus according to claim 10, wherein the control unit controls to alternately perform a conveyance operation using the conveyance roller and a printing operation in which the printing head moves in a direction crossing the conveyance direction to print an image, and in the conveyance operation, the control unit causes the conveyance roller to convey a sheet with the first conveyance amount or with the second conveyance amount.

12. A printing method comprising:

conveying a sheet in a conveyance direction using a conveyance roller;

printing, using a printing unit, an image onto a sheet which is conveyed, a first conveyance path and a second conveyance path being provided downstream of the printing unit in the conveyance direction for discharging a sheet on which an image is printed by the printing unit;

controlling so that:

in a case of conveying a sheet along the first conveyance path, the sheet is conveyed by the conveyance roller with a first conveyance amount, and in a case of conveying a sheet along the second conveyance path, the sheet is conveyed by the conveyance roller with a second conveyance amount different from the first conveyance amount; and executing a first mode in which a sheet is conveyed along the first conveyance path by the conveyance roller and a first correction value for the first conveyance amount is obtained, and a second mode in which a sheet is conveyed along the second conveyance path by the conveyance roller and a second correction value for the second conveyance amount is obtained.

13. The printing method according to claim 12, wherein the second correction value is derived based on the first correction value.

14. The printing method according to claim 12, further comprising discharging a sheet using a discharge roller which is provided downstream of the conveyance roller on the second conveyance path, wherein a conveyance amount of a sheet is changed between a case in which a leading edge of the sheet is between the discharge roller and the conveyance roller and a case in which the leading edge of the sheet is downstream of the discharge roller.

15. The printing method according to claim 14, further comprising stacking sheets conveyed by the discharge roller on a printing apparatus.

* * * * *